United States Patent
Amdahl et al.

(10) Patent No.: US 10,187,317 B1
(45) Date of Patent: Jan. 22, 2019

(54) METHODS FOR TRAFFIC RATE CONTROL AND DEVICES THEREOF

(71) Applicant: F5 Networks, Inc., Seattle, WA (US)

(72) Inventors: Saxon Amdahl, Portola Valley, CA (US); Sumandra Majee, San Jose, CA (US); Rajendra Shukla, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 203 days.

(21) Appl. No.: 14/542,840

(22) Filed: Nov. 17, 2014

Related U.S. Application Data

(60) Provisional application No. 61/905,011, filed on Nov. 15, 2013.

(51) Int. Cl.
*H04L 12/801* (2013.01)
*H04W 28/02* (2009.01)
(Continued)

(52) U.S. Cl.
CPC .......... *H04L 47/39* (2013.01); *H04L 47/215* (2013.01); *H04W 28/0215* (2013.01); *H04W 72/0446* (2013.01)

(58) Field of Classification Search
CPC ......... H04L 47/39; H04L 47/215; H04L 9/39; H04L 9/215; H04W 28/0215; H04W 28/0446
See application file for complete search history.

(56) References Cited

U.S. PATENT DOCUMENTS

| 3,950,735 A | 4/1976 | Patel |
| 4,644,532 A | 2/1987 | George et al. |

(Continued)

FOREIGN PATENT DOCUMENTS

| CA | 2080530 A1 | 4/1994 |
| EP | 0605088 A3 | 2/1996 |

(Continued)

OTHER PUBLICATIONS

F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

(Continued)

*Primary Examiner* — Michael Thier
*Assistant Examiner* — Zhensheng Zhang
(74) *Attorney, Agent, or Firm* — LeClairRyan PLLC

(57) ABSTRACT

A method, non-transitory computer readable medium, and traffic management computing device that allocates a subset of tokens to active subscribers based on an estimated number of subscribers that will be active in a next sampling period. A request to transmit a first packet is received from one of the active subscribers. A determination is made when a current time is prior to an expiration of the allocated subset of the tokens. Another determination is made when a length of the first packet is less than a size corresponding to an available portion of the allocated subset of the tokens when the current time is determined to be prior to the expiration of the allocated subset of the tokens. The first packet is transmitted when the length of the first packet is determined to be less than a size corresponding to an available portion of the allocated subset of the tokens.

20 Claims, 5 Drawing Sheets

(51) Int. Cl.
*H04W 72/04* (2009.01)
*H04L 12/819* (2013.01)

(56) References Cited

U.S. PATENT DOCUMENTS

| | | | |
|---|---|---|---|
| 4,897,781 A | 1/1990 | Chang et al. | |
| 4,965,772 A | 10/1990 | Daniel et al. | |
| 5,023,826 A | 6/1991 | Patel | |
| 5,053,953 A | 10/1991 | Patel | |
| 5,167,024 A | 11/1992 | Smith et al. | |
| 5,282,201 A | 1/1994 | Frank et al. | |
| 5,299,312 A | 3/1994 | Rocco, Jr. | |
| 5,327,529 A | 7/1994 | Fults et al. | |
| 5,367,635 A | 11/1994 | Bauer et al. | |
| 5,371,852 A | 12/1994 | Attanasio et al. | |
| 5,406,502 A | 4/1995 | Haramaty et al. | |
| 5,475,857 A | 12/1995 | Dally | |
| 5,517,617 A | 5/1996 | Sathaye et al. | |
| 5,519,694 A | 5/1996 | Brewer et al. | |
| 5,519,778 A | 5/1996 | Leighton et al. | |
| 5,521,591 A | 5/1996 | Arora et al. | |
| 5,528,701 A | 6/1996 | Aref | |
| 5,550,816 A | 8/1996 | Hardwick et al. | |
| 5,581,764 A | 12/1996 | Fitzgerald et al. | |
| 5,596,742 A | 1/1997 | Agarwal et al. | |
| 5,606,665 A | 2/1997 | Yang et al. | |
| 5,611,049 A | 3/1997 | Pitts | |
| 5,623,490 A | 4/1997 | Richter et al. | |
| 5,663,018 A | 9/1997 | Cummings et al. | |
| 5,752,023 A | 5/1998 | Choucri et al. | |
| 5,761,484 A | 6/1998 | Agarwal et al. | |
| 5,768,423 A | 6/1998 | Aref et al. | |
| 5,774,660 A | 6/1998 | Brendel et al. | |
| 5,790,554 A | 8/1998 | Pitcher et al. | |
| 5,793,302 A | 8/1998 | Stambler | |
| 5,802,052 A | 9/1998 | Venkataraman | |
| 5,812,550 A | 9/1998 | Sohn et al. | |
| 5,825,772 A | 10/1998 | Dobbins et al. | |
| 5,832,283 A | 11/1998 | Chou et al. | |
| 5,862,326 A | 1/1999 | Bapat | |
| 5,875,296 A | 2/1999 | Shi et al. | |
| 5,892,914 A | 4/1999 | Pitts | |
| 5,892,932 A | 4/1999 | Kim | |
| 5,905,872 A | 5/1999 | DeSimone et al. | |
| 5,919,247 A | 7/1999 | Van Hoff et al. | |
| 5,936,939 A | 8/1999 | Des Jardins et al. | |
| 5,941,988 A | 8/1999 | Bhagwat et al. | |
| 5,946,690 A | 8/1999 | Pitts | |
| 5,949,885 A | 9/1999 | Leighton | |
| 5,951,694 A | 9/1999 | Choquier et al. | |
| 5,959,990 A | 9/1999 | Frantz et al. | |
| 5,974,148 A | 10/1999 | Stambler | |
| 5,974,460 A | 10/1999 | Maddalozzo, Jr. et al. | |
| 5,983,281 A | 11/1999 | Ogle et al. | |
| 5,988,847 A | 11/1999 | McLaughlin et al. | |
| 5,991,302 A | 11/1999 | Berl et al. | |
| 5,995,491 A | 11/1999 | Richter et al. | |
| 6,006,260 A | 12/1999 | Barrick, Jr. et al. | |
| 6,006,264 A | 12/1999 | Colby et al. | |
| 6,026,452 A | 2/2000 | Pitts | |
| 6,026,500 A | 2/2000 | Topff et al. | |
| 6,028,857 A | 2/2000 | Poor | |
| 6,029,175 A | 2/2000 | Chow et al. | |
| 6,041,365 A | 3/2000 | Kleinerman | |
| 6,046,979 A * | 4/2000 | Bauman | H04L 47/10 |
| | | | 370/229 |
| 6,047,356 A | 4/2000 | Anderson et al. | |
| 6,051,169 A | 4/2000 | Brown et al. | |
| 6,067,558 A | 5/2000 | Wendt et al. | |
| 6,078,956 A | 6/2000 | Bryant et al. | |
| 6,085,234 A | 7/2000 | Pitts et al. | |
| 6,092,196 A | 7/2000 | Reiche | |
| 6,104,706 A | 8/2000 | Richter et al. | |
| 6,108,703 A | 8/2000 | Leighton et al. | |
| 6,111,876 A | 8/2000 | Frantz et al. | |
| 6,128,279 A | 10/2000 | O'Neil et al. | |
| 6,128,657 A | 10/2000 | Okanoya et al. | |
| 6,154,777 A | 11/2000 | Ebrahim | |
| 6,157,950 A | 12/2000 | Krishnan | |
| 6,160,874 A | 12/2000 | Dickerman et al. | |
| 6,170,022 B1 | 1/2001 | Linville et al. | |
| 6,178,423 B1 | 1/2001 | Douceur et al. | |
| 6,182,139 B1 | 1/2001 | Brendel | |
| 6,192,051 B1 | 2/2001 | Lipman et al. | |
| 6,233,612 B1 | 5/2001 | Fruchtman et al. | |
| 6,246,684 B1 | 6/2001 | Chapman et al. | |
| 6,253,226 B1 | 6/2001 | Chidambaran et al. | |
| 6,253,230 B1 | 6/2001 | Couland et al. | |
| 6,259,405 B1 | 7/2001 | Stewart et al. | |
| 6,260,070 B1 | 7/2001 | Shah | |
| 6,263,368 B1 | 7/2001 | Martin | |
| 6,289,012 B1 | 9/2001 | Harrington et al. | |
| 6,292,832 B1 | 9/2001 | Shah et al. | |
| 6,298,380 B1 | 10/2001 | Coile et al. | |
| 6,304,913 B1 | 10/2001 | Rune | |
| 6,311,278 B1 | 10/2001 | Raanan et al. | |
| 6,327,622 B1 | 12/2001 | Jindal et al. | |
| 6,330,574 B1 | 12/2001 | Murashita | |
| 6,336,147 B1 | 1/2002 | Brownell et al. | |
| 6,338,082 B1 | 1/2002 | Schneider | |
| 6,343,324 B1 | 1/2002 | Hubis et al. | |
| 6,347,339 B1 | 2/2002 | Morris et al. | |
| 6,353,848 B1 | 3/2002 | Morris | |
| 6,360,270 B1 | 3/2002 | Cherkasova et al. | |
| 6,363,056 B1 | 3/2002 | Beigi et al. | |
| 6,370,527 B1 | 4/2002 | Singhal | |
| 6,374,300 B2 | 4/2002 | Masters | |
| 6,389,462 B1 | 5/2002 | Cohen et al. | |
| 6,396,833 B1 | 5/2002 | Zhang et al. | |
| 6,411,986 B1 | 6/2002 | Susai et al. | |
| 6,430,562 B1 | 8/2002 | Kardos et al. | |
| 6,434,081 B1 | 8/2002 | Johnson et al. | |
| 6,446,108 B1 | 9/2002 | Rosenberg et al. | |
| 6,466,580 B1 | 10/2002 | Leung | |
| 6,469,983 B2 | 10/2002 | Narayana et al. | |
| 6,480,476 B1 | 11/2002 | Willars | |
| 6,484,261 B1 | 11/2002 | Wiegel | |
| 6,490,624 B1 | 12/2002 | Sampson et al. | |
| 6,510,135 B1 | 1/2003 | Almulhem et al. | |
| 6,510,458 B1 | 1/2003 | Berstis et al. | |
| 6,513,061 B1 | 1/2003 | Ebata et al. | |
| 6,514,085 B2 | 2/2003 | Slattery et al. | |
| 6,519,643 B1 | 2/2003 | Foulkes et al. | |
| 6,542,936 B1 | 4/2003 | Mayle et al. | |
| 6,560,230 B1 | 5/2003 | Li et al. | |
| 6,578,069 B1 | 6/2003 | Hopmann et al. | |
| 6,601,084 B1 | 7/2003 | Bhaskaran et al. | |
| 6,615,267 B1 | 9/2003 | Whalen et al. | |
| 6,631,422 B1 | 10/2003 | Althaus et al. | |
| 6,636,503 B1 | 10/2003 | Shiran et al. | |
| 6,636,894 B1 | 10/2003 | Short et al. | |
| 6,650,640 B1 | 11/2003 | Muller et al. | |
| 6,650,641 B1 | 11/2003 | Albert et al. | |
| 6,654,346 B1 | 11/2003 | Mahalingaiah et al. | |
| 6,654,701 B2 | 11/2003 | Hatley | |
| 6,661,802 B1 | 12/2003 | Homberg et al. | |
| 6,683,873 B1 | 1/2004 | Kwok et al. | |
| 6,691,165 B1 | 2/2004 | Bruck et al. | |
| 6,694,517 B1 | 2/2004 | James et al. | |
| 6,701,415 B1 | 3/2004 | Hendren, III | |
| 6,708,187 B1 | 3/2004 | Shanumgam et al. | |
| 6,708,220 B1 | 3/2004 | Olin | |
| 6,718,380 B1 | 4/2004 | Mohaban et al. | |
| 6,728,704 B2 | 4/2004 | Mao et al. | |
| 6,738,357 B1 | 5/2004 | Richter et al. | |
| 6,742,045 B1 | 5/2004 | Albert et al. | |
| 6,744,776 B1 | 6/2004 | Kalkunte et al. | |
| 6,751,663 B1 | 6/2004 | Farrell et al. | |
| 6,754,215 B1 | 6/2004 | Arikawa et al. | |
| 6,754,228 B1 | 6/2004 | Ludwig | |
| 6,754,699 B2 | 6/2004 | Swildens et al. | |
| 6,760,337 B1 | 7/2004 | Snyder, II et al. | |
| 6,760,775 B1 | 7/2004 | Anerousis et al. | |
| 6,772,219 B1 | 8/2004 | Shobatake | |

(56) References Cited

U.S. PATENT DOCUMENTS

| | | | |
|---|---|---|---|
| 6,779,039 | B1 | 8/2004 | Bommareddy et al. |
| 6,781,986 | B1 | 8/2004 | Sabaa et al. |
| 6,795,860 | B1 | 9/2004 | Shah |
| 6,798,777 | B1 | 9/2004 | Ferguson et al. |
| 6,804,542 | B1 | 10/2004 | Haartsen |
| 6,816,901 | B1 | 11/2004 | Sitaraman et al. |
| 6,816,977 | B2 | 11/2004 | Brakmo et al. |
| 6,826,698 | B1 | 11/2004 | Minkin et al. |
| 6,829,238 | B2 | 12/2004 | Tokuyo et al. |
| 6,829,649 | B1 * | 12/2004 | Shorey ............ H04L 12/5693 709/235 |
| 6,857,009 | B1 | 2/2005 | Ferreria |
| 6,862,282 | B1 | 3/2005 | Oden |
| 6,865,593 | B1 | 3/2005 | Reshef et al. |
| 6,868,082 | B1 | 3/2005 | Allen, Jr. et al. |
| 6,868,447 | B1 | 3/2005 | Slaughter et al. |
| 6,871,221 | B1 | 3/2005 | Styles |
| 6,876,629 | B2 | 4/2005 | Beshai et al. |
| 6,876,654 | B1 | 4/2005 | Hegde |
| 6,880,017 | B1 | 4/2005 | Marce et al. |
| 6,883,137 | B1 | 4/2005 | Girardot et al. |
| 6,888,836 | B1 | 5/2005 | Cherkasova |
| 6,904,040 | B2 | 6/2005 | Salapura et al. |
| 6,914,881 | B1 | 7/2005 | Mansfield et al. |
| 6,928,082 | B2 | 8/2005 | Liu et al. |
| 6,928,518 | B2 | 8/2005 | Talagala |
| 6,947,985 | B2 | 9/2005 | Hegli et al. |
| 6,950,434 | B1 | 9/2005 | Viswanath et al. |
| 6,954,780 | B2 | 10/2005 | Susai et al. |
| 6,957,272 | B2 | 10/2005 | Tallegas et al. |
| 6,959,394 | B1 | 10/2005 | Brickell et al. |
| 6,970,475 | B1 | 11/2005 | Fraser et al. |
| 6,970,924 | B1 | 11/2005 | Chu et al. |
| 6,973,490 | B1 | 12/2005 | Robertson et al. |
| 6,975,592 | B1 | 12/2005 | Seddigh et al. |
| 6,986,040 | B1 | 1/2006 | Kramer et al. |
| 6,987,763 | B2 | 1/2006 | Rochberger et al. |
| 6,990,074 | B2 | 1/2006 | Wan et al. |
| 6,990,114 | B1 | 1/2006 | Erimli et al. |
| 7,003,564 | B2 | 2/2006 | Greuel et al. |
| 7,006,502 | B2 | 2/2006 | Lin |
| 7,007,092 | B2 | 2/2006 | Peiffer |
| 7,020,713 | B1 | 3/2006 | Shah et al. |
| 7,023,974 | B1 | 4/2006 | Brannam et al. |
| 7,035,212 | B1 | 4/2006 | Mittal et al. |
| 7,039,061 | B2 | 5/2006 | Connor et al. |
| 7,058,633 | B1 | 6/2006 | Gnagy et al. |
| 7,065,482 | B2 | 6/2006 | Shorey et al. |
| 7,075,924 | B2 | 7/2006 | Richter et al. |
| 7,076,689 | B2 | 7/2006 | Atkinson |
| 7,080,314 | B1 | 7/2006 | Garofalakis et al. |
| 7,089,491 | B2 | 8/2006 | Feinberg et al. |
| 7,113,993 | B1 | 9/2006 | Cappiello et al. |
| 7,113,996 | B2 | 9/2006 | Kronenberg |
| 7,120,666 | B2 | 10/2006 | McCanne et al. |
| 7,133,863 | B2 | 11/2006 | Teng et al. |
| 7,133,944 | B2 | 11/2006 | Song et al. |
| 7,139,792 | B1 | 11/2006 | Mishra et al. |
| 7,155,722 | B1 | 12/2006 | Hilla et al. |
| 7,161,904 | B2 | 1/2007 | Hussain et al. |
| 7,185,359 | B2 | 2/2007 | Schmidt et al. |
| 7,191,163 | B2 | 3/2007 | Herrera et al. |
| 7,206,282 | B1 | 4/2007 | Goldman et al. |
| 7,228,359 | B1 | 6/2007 | Monteiro |
| 7,228,422 | B2 | 6/2007 | Morioka et al. |
| 7,236,491 | B2 | 6/2007 | Tsao et al. |
| 7,240,100 | B1 | 7/2007 | Wein et al. |
| 7,257,633 | B2 | 8/2007 | Masputra et al. |
| 7,283,470 | B1 | 10/2007 | Sindhu et al. |
| 7,287,082 | B1 | 10/2007 | O'Toole, Jr. |
| 7,292,541 | B1 | 11/2007 | Cs |
| 7,295,827 | B2 | 11/2007 | Liu et al. |
| 7,296,263 | B1 | 11/2007 | Jacob |
| 7,308,475 | B1 | 12/2007 | Pruitt et al. |
| 7,308,703 | B2 | 12/2007 | Wright et al. |
| 7,308,709 | B1 | 12/2007 | Brezak et al. |
| 7,310,339 | B1 | 12/2007 | Powers et al. |
| 7,319,696 | B2 | 1/2008 | Inoue et al. |
| 7,321,926 | B1 | 1/2008 | Zhang et al. |
| 7,324,533 | B1 | 1/2008 | DeLiberato et al. |
| 7,333,999 | B1 | 2/2008 | Njemanze |
| 7,340,571 | B2 | 3/2008 | Saze |
| 7,343,413 | B2 | 3/2008 | Gilde et al. |
| 7,349,391 | B2 | 3/2008 | Ben-Dor et al. |
| 7,373,438 | B1 | 5/2008 | DeBergalis et al. |
| 7,383,570 | B2 | 6/2008 | Pinkas et al. |
| 7,398,552 | B2 | 7/2008 | Pardee et al. |
| 7,409,440 | B1 | 8/2008 | Jacob |
| 7,433,962 | B2 | 10/2008 | Janssen et al. |
| 7,437,478 | B2 | 10/2008 | Yokota et al. |
| 7,454,480 | B2 | 11/2008 | Labio et al. |
| 7,490,162 | B1 | 2/2009 | Masters |
| 7,500,243 | B2 | 3/2009 | Huetsch et al. |
| 7,500,269 | B2 | 3/2009 | Huotari et al. |
| 7,505,795 | B1 | 3/2009 | Lim et al. |
| 7,516,492 | B1 | 4/2009 | Nisbet et al. |
| 7,522,581 | B2 | 4/2009 | Acharya et al. |
| 7,526,541 | B2 | 4/2009 | Roese et al. |
| 7,555,608 | B2 | 6/2009 | Naik et al. |
| 7,558,197 | B1 | 7/2009 | Sindhu et al. |
| 7,577,723 | B2 | 8/2009 | Matsuda et al. |
| 7,580,971 | B1 | 8/2009 | Gollapudi et al. |
| 7,590,732 | B2 | 9/2009 | Rune |
| 7,624,424 | B2 | 11/2009 | Morita et al. |
| 7,640,347 | B1 | 12/2009 | Sloat et al. |
| 7,644,137 | B2 | 1/2010 | Bozak et al. |
| 7,668,166 | B1 | 2/2010 | Rekhter et al. |
| 7,680,915 | B2 | 3/2010 | Still et al. |
| 7,684,423 | B2 | 3/2010 | Tripathi et al. |
| 7,689,710 | B2 | 3/2010 | Tang et al. |
| 7,698,458 | B1 | 4/2010 | Liu et al. |
| 7,706,261 | B2 | 4/2010 | Sun et al. |
| 7,724,657 | B2 | 5/2010 | Rao et al. |
| 7,725,093 | B2 | 5/2010 | Sengupta et al. |
| 7,778,187 | B2 | 8/2010 | Chaturvedi et al. |
| 7,801,978 | B1 | 9/2010 | Susai et al. |
| 7,808,913 | B2 | 10/2010 | Ansari et al. |
| 7,822,839 | B1 | 10/2010 | Pruitt et al. |
| 7,831,662 | B2 | 11/2010 | Clark et al. |
| 7,861,085 | B1 | 12/2010 | Case et al. |
| 7,876,677 | B2 | 1/2011 | Cheshire |
| 7,895,653 | B2 | 2/2011 | Calo et al. |
| 7,903,554 | B1 | 3/2011 | Manur et al. |
| 7,908,245 | B2 | 3/2011 | Nakano et al. |
| 7,908,314 | B2 | 3/2011 | Yamaguchi et al. |
| 7,925,908 | B2 | 4/2011 | Kim |
| 7,930,365 | B2 | 4/2011 | Dixit et al. |
| 7,933,496 | B2 | 4/2011 | Livshits et al. |
| 7,933,946 | B2 | 4/2011 | Livshits et al. |
| 7,945,908 | B1 | 5/2011 | Waldspurger et al. |
| 7,958,222 | B1 | 6/2011 | Pruitt et al. |
| 7,984,141 | B2 | 7/2011 | Gupta et al. |
| 7,984,500 | B1 | 7/2011 | Khanna et al. |
| 8,024,443 | B1 | 9/2011 | Jacob |
| 8,037,528 | B2 | 10/2011 | Williams et al. |
| 8,041,022 | B1 | 10/2011 | Andreasen et al. |
| 8,064,342 | B2 | 11/2011 | Badger |
| 8,069,225 | B2 | 11/2011 | McCanne et al. |
| 8,103,781 | B1 | 1/2012 | Wu et al. |
| 8,130,650 | B2 | 3/2012 | Allen, Jr. et al. |
| 8,149,819 | B2 | 4/2012 | Kobayashi et al. |
| 8,155,128 | B2 | 4/2012 | Balyan et al. |
| 8,171,124 | B2 | 5/2012 | Kondamuru |
| 8,189,567 | B2 | 5/2012 | Kavanagh et al. |
| 8,190,769 | B1 | 5/2012 | Shukla et al. |
| 8,199,757 | B2 | 6/2012 | Pani et al. |
| 8,205,246 | B2 | 6/2012 | Shatzkamer et al. |
| 8,239,954 | B2 | 8/2012 | Wobber et al. |
| 8,271,620 | B2 | 9/2012 | Witchey |
| 8,274,895 | B2 | 9/2012 | Rahman et al. |
| 8,321,908 | B2 | 11/2012 | Gai et al. |
| 8,351,333 | B2 | 1/2013 | Rao et al. |
| 8,380,854 | B2 | 2/2013 | Szabo |
| 8,396,836 | B1 | 3/2013 | Ferguson et al. |

(56) References Cited

U.S. PATENT DOCUMENTS

| | | |
|---|---|---|
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,463,850 B1 | 6/2013 | McCann |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,539,224 B2 | 9/2013 | Henderson et al. |
| 8,560,693 B1 | 10/2013 | Wang et al. |
| 8,566,474 B2 | 10/2013 | Kanode et al. |
| 8,578,050 B2 | 11/2013 | Craig et al. |
| 8,601,000 B1 | 12/2013 | Stefani et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,665,969 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,838,817 B1 | 9/2014 | Biswas |
| 8,873,753 B2 | 10/2014 | Parker |
| 8,875,274 B2 | 10/2014 | Montemurro et al. |
| 8,879,431 B2 | 11/2014 | Ridel et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 8,954,492 B1 | 2/2015 | Lowell, Jr. |
| 8,959,215 B2 | 2/2015 | Koponen et al. |
| 9,036,529 B2 | 5/2015 | Erickson et al. |
| 9,037,166 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 9,137,301 B1 | 9/2015 | Dunlap |
| 9,143,451 B2 | 9/2015 | Amdahl et al. |
| 9,244,843 B1 | 1/2016 | Michels et al. |
| 9,497,614 B1 | 11/2016 | Ridel et al. |
| 2001/0000083 A1 | 3/2001 | Crow |
| 2001/0007560 A1 | 7/2001 | Masuda et al. |
| 2001/0009554 A1 | 7/2001 | Katseff et al. |
| 2001/0023442 A1 | 9/2001 | Masters |
| 2002/0010757 A1 | 1/2002 | Granik et al. |
| 2002/0010783 A1 | 1/2002 | Primak et al. |
| 2002/0012352 A1 | 1/2002 | Hansson et al. |
| 2002/0032758 A1 | 1/2002 | Yen et al. |
| 2002/0032777 A1 | 3/2002 | Kawata et al. |
| 2002/0038360 A1 | 3/2002 | Andrews et al. |
| 2002/0046291 A1 | 4/2002 | O'Callaghan et al. |
| 2002/0049842 A1 | 4/2002 | Huetsch et al. |
| 2002/0059428 A1 | 5/2002 | Susai et al. |
| 2002/0065848 A1 | 5/2002 | Walker et al. |
| 2002/0072048 A1 | 6/2002 | Slattery et al. |
| 2002/0083067 A1 | 6/2002 | Tamayo et al. |
| 2002/0087571 A1 | 7/2002 | Stapel et al. |
| 2002/0087744 A1 | 7/2002 | Kitchin |
| 2002/0095498 A1 | 7/2002 | Chanda et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0112061 A1 | 8/2002 | Shih et al. |
| 2002/0138615 A1 | 9/2002 | Schmeling |
| 2002/0143819 A1 | 10/2002 | Han et al. |
| 2002/0143852 A1 | 10/2002 | Guo et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0188753 A1 | 12/2002 | Tang et al. |
| 2002/0194112 A1 | 12/2002 | DePinto et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005144 A1 | 1/2003 | Engel et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0018927 A1 | 2/2003 | Gadir et al. |
| 2003/0034905 A1 | 2/2003 | Anton et al. |
| 2003/0037070 A1 | 2/2003 | Marston |
| 2003/0046291 A1 | 3/2003 | Fascenda |
| 2003/0046335 A1 | 3/2003 | Doyle et al. |
| 2003/0051045 A1 | 3/2003 | Connor |
| 2003/0055723 A1 | 3/2003 | English |
| 2003/0065653 A1 | 4/2003 | Overton et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0086415 A1 | 5/2003 | Bernhard et al. |
| 2003/0105807 A1 | 6/2003 | Thompson et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0130945 A1 | 7/2003 | Force |
| 2003/0131052 A1 | 7/2003 | Allan |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0163576 A1 | 8/2003 | Janssen et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0208596 A1 | 11/2003 | Carolan et al. |
| 2003/0212954 A1 | 11/2003 | Patrudu |
| 2003/0220835 A1 | 11/2003 | Barnes, Jr. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003287 A1 | 1/2004 | Zissimopoulos et al. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093361 A1 | 5/2004 | Therrien et al. |
| 2004/0103206 A1 | 5/2004 | Hsu et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0141185 A1 | 8/2004 | Akama |
| 2004/0151186 A1 | 8/2004 | Akama |
| 2004/0167967 A1 | 8/2004 | Bastian et al. |
| 2004/0177165 A1 | 9/2004 | Masputra et al. |
| 2004/0192312 A1 | 9/2004 | Li et al. |

(56) References Cited

U.S. PATENT DOCUMENTS

| | | |
|---|---|---|
| 2004/0199762 A1 | 10/2004 | Carlson et al. |
| 2004/0210663 A1 | 10/2004 | Phillips et al. |
| 2004/0213156 A1 | 10/2004 | Smallwood et al. |
| 2004/0215665 A1 | 10/2004 | Edgar et al. |
| 2004/0215746 A1 | 10/2004 | McCanne et al. |
| 2004/0236826 A1 | 11/2004 | Harville et al. |
| 2004/0243703 A1 | 12/2004 | Demmer et al. |
| 2004/0255000 A1 | 12/2004 | Simionescu et al. |
| 2004/0260745 A1 | 12/2004 | Gage et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0008017 A1 | 1/2005 | Dana et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0117589 A1 | 6/2005 | Douady et al. |
| 2005/0122942 A1 | 6/2005 | Rhee et al. |
| 2005/0122977 A1 | 6/2005 | Lieberman |
| 2005/0125553 A1 | 6/2005 | Wu et al. |
| 2005/0154837 A1 | 7/2005 | Keohane et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2005/0262238 A1 | 11/2005 | Reeves et al. |
| 2005/0273456 A1 | 12/2005 | Revanuru et al. |
| 2005/0273645 A1 | 12/2005 | Satran |
| 2005/0273843 A1 | 12/2005 | Shigeeda |
| 2005/0288939 A1 | 12/2005 | Peled et al. |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0045089 A1 | 3/2006 | Sadler et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0100752 A1 | 5/2006 | Kim et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123210 A1 | 6/2006 | Pritchett et al. |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209669 A1 | 9/2006 | Nishio |
| 2006/0209853 A1 | 9/2006 | Hidaka et al. |
| 2006/0229861 A1 | 10/2006 | Tatsuoka et al. |
| 2006/0230148 A1 | 10/2006 | Forecast et al. |
| 2006/0233106 A1 | 10/2006 | Achlioptas et al. |
| 2006/0235998 A1 | 10/2006 | Stecher et al. |
| 2006/0242300 A1 | 10/2006 | Yumoto et al. |
| 2006/0248194 A1 | 11/2006 | Ly et al. |
| 2006/0259320 A1 | 11/2006 | LaSalle et al. |
| 2006/0268692 A1 | 11/2006 | Wright et al. |
| 2006/0268704 A1 | 11/2006 | Ansari et al. |
| 2006/0270341 A1 | 11/2006 | Kim et al. |
| 2006/0282442 A1 | 12/2006 | Lennon et al. |
| 2006/0291483 A1 | 12/2006 | Sela |
| 2006/0294054 A1 | 12/2006 | Kudo et al. |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0019636 A1 | 1/2007 | Lau et al. |
| 2007/0019658 A1 | 1/2007 | Park et al. |
| 2007/0038994 A1 | 2/2007 | Davis et al. |
| 2007/0044060 A1 | 2/2007 | Waller |
| 2007/0297410 A1 | 2/2007 | Yoon et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0067373 A1 | 3/2007 | Higgins et al. |
| 2007/0067771 A1 | 3/2007 | Kulbak et al. |
| 2007/0083646 A1 | 4/2007 | Miller et al. |
| 2007/0088822 A1 | 4/2007 | Coile et al. |
| 2007/0104115 A1 | 5/2007 | Decasper et al. |
| 2007/0106796 A1 | 5/2007 | Kudo et al. |
| 2007/0107048 A1 | 5/2007 | Halls et al. |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0130255 A1 | 6/2007 | VVolovitz et al. |
| 2007/0147246 A1 | 6/2007 | Hurley et al. |
| 2007/0162891 A1 | 7/2007 | Bumer et al. |
| 2007/0168320 A1 | 7/2007 | Borthakur et al. |
| 2007/0168525 A1 | 7/2007 | DeLeon et al. |
| 2007/0174491 A1 | 7/2007 | Still et al. |
| 2007/0192543 A1 | 8/2007 | Naik et al. |
| 2007/0220598 A1 | 9/2007 | Salowey et al. |
| 2007/0233809 A1 | 10/2007 | Brownell et al. |
| 2007/0233826 A1 | 10/2007 | Tindal et al. |
| 2007/0250560 A1 | 10/2007 | Wein et al. |
| 2007/0258451 A1 | 11/2007 | Bouat |
| 2007/0283023 A1 | 12/2007 | Ly et al. |
| 2007/0288484 A1 | 12/2007 | Yan et al. |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khendouri et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0072303 A1 | 3/2008 | Syed |
| 2008/0120370 A1 | 5/2008 | Chan et al. |
| 2008/0120592 A1 | 5/2008 | Tanguay et al. |
| 2008/0133518 A1 | 6/2008 | Kapoor et al. |
| 2008/0133771 A1 | 6/2008 | Vardi |
| 2008/0134311 A1 | 6/2008 | Medvinsky et al. |
| 2008/0141246 A1 | 6/2008 | Kuck et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0172488 A1 | 7/2008 | Jawahar |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |

(56) References Cited

U.S. PATENT DOCUMENTS

| | | |
|---|---|---|
| 2008/0209524 A1 | 8/2008 | Almog |
| 2008/0222646 A1 | 9/2008 | Sigal et al. |
| 2008/0225710 A1 | 9/2008 | Raja et al. |
| 2008/0228911 A1 | 9/2008 | Mackey |
| 2008/0229025 A1 | 9/2008 | Plamondon |
| 2008/0229415 A1 | 9/2008 | Kapoor et al. |
| 2008/0235508 A1 | 9/2008 | Ran et al. |
| 2008/0239986 A1 | 10/2008 | Ku et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0279200 A1 | 11/2008 | Shatzkamer et al. |
| 2008/0281908 A1 | 11/2008 | McCanne et al. |
| 2008/0281944 A1 | 11/2008 | Vome et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1 | 1/2009 | Balabine et al. |
| 2009/0037998 A1 | 2/2009 | Adhya et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0094610 A1 | 4/2009 | Sukirya |
| 2009/0097480 A1 | 4/2009 | Curtis et al. |
| 2009/0106413 A1 | 4/2009 | Salo et al. |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0144286 A1 | 6/2009 | Chatley et al. |
| 2009/0157678 A1 | 6/2009 | Turk |
| 2009/0161542 A1 | 6/2009 | Ho |
| 2009/0187915 A1 | 7/2009 | Chew et al. |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0217163 A1 | 8/2009 | Jaroker |
| 2009/0217386 A1 | 8/2009 | Schneider |
| 2009/0228956 A1 | 9/2009 | He et al. |
| 2009/0241176 A1 | 9/2009 | Beletski et al. |
| 2009/0248870 A1 | 10/2009 | Kamei et al. |
| 2009/0248893 A1 | 10/2009 | Richardson et al. |
| 2009/0265396 A1 | 10/2009 | Ram et al. |
| 2009/0265467 A1 | 10/2009 | Peles |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0316708 A1 | 12/2009 | Yahyaoui et al. |
| 2009/0319600 A1 | 12/2009 | Sedan et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0093318 A1 | 4/2010 | Zhu et al. |
| 2010/0103820 A1 | 4/2010 | Fuller et al. |
| 2010/0115236 A1 | 5/2010 | Bataineh et al. |
| 2010/0122091 A1 | 5/2010 | Huang et al. |
| 2010/0131654 A1 | 5/2010 | Malakapalli et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0179984 A1 | 7/2010 | Sebastian |
| 2010/0188976 A1 | 7/2010 | Rahman et al. |
| 2010/0189052 A1 | 7/2010 | Kavanagh et al. |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0261479 A1 | 10/2010 | Hidaka |
| 2010/0274772 A1 | 10/2010 | Samuels |
| 2010/0278733 A1 | 11/2010 | Karsten et al. |
| 2010/0284476 A1* | 11/2010 | Potkonjak ............ H04L 1/1858 375/260 |
| 2010/0299451 A1 | 11/2010 | Yigang et al. |
| 2010/0306169 A1 | 12/2010 | Pishevar et al. |
| 2010/0306827 A1 | 12/2010 | Esteve Balducci et al. |
| 2010/0322250 A1 | 12/2010 | Shelly et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075592 A1* | 3/2011 | Beecroft ............... H04L 1/1607 370/276 |
| 2011/0075667 A1 | 3/2011 | Li et al. |
| 2011/0078303 A1 | 3/2011 | Li et al. |
| 2011/0098087 A1 | 4/2011 | Tseng |
| 2011/0107077 A1 | 5/2011 | Henderson et al. |
| 2011/0113095 A1 | 5/2011 | Hatami-Hanza |
| 2011/0153822 A1 | 6/2011 | Rajan et al. |
| 2011/0153985 A1 | 6/2011 | Pafumi et al. |
| 2011/0154443 A1 | 6/2011 | Thakur et al. |
| 2011/0185065 A1 | 6/2011 | Stanisic et al. |
| 2011/0173295 A1 | 7/2011 | Bakke et al. |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |
| 2011/0202676 A1 | 8/2011 | Craig et al. |
| 2011/0213911 A1 | 9/2011 | Eldus et al. |
| 2011/0225302 A1 | 9/2011 | Park |
| 2011/0246800 A1 | 10/2011 | Accpadi et al. |
| 2011/0273984 A1 | 11/2011 | Hsu et al. |
| 2011/0277016 A1 | 11/2011 | Hockings et al. |
| 2011/0282700 A1 | 11/2011 | Cockcroft |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0094631 A1 | 4/2012 | Pattabiraman |
| 2012/0101952 A1 | 4/2012 | Raleigh et al. |
| 2012/0102011 A1 | 5/2012 | Matsuki et al. |
| 2012/0117028 A1 | 5/2012 | Gold et al. |
| 2012/0124372 A1 | 5/2012 | Dilley et al. |
| 2012/0137020 A1 | 5/2012 | Ehlers |
| 2012/0150805 A1 | 6/2012 | Pafumi et al. |
| 2012/0158988 A1 | 6/2012 | Fatehpuria |
| 2012/0191847 A1 | 7/2012 | Nas et al. |
| 2012/0195273 A1 | 8/2012 | Iwamura et al. |
| 2012/0198043 A1 | 8/2012 | Hesketh et al. |
| 2012/0224531 A1 | 9/2012 | Karuturi et al. |
| 2012/0254293 A1 | 10/2012 | Winter et al. |
| 2012/0257506 A1 | 10/2012 | BazIamacci et al. |
| 2012/0258766 A1 | 10/2012 | Cho et al. |
| 2012/0311153 A1 | 12/2012 | Morgan |
| 2012/0311174 A1 | 12/2012 | Bichot |
| 2012/0317266 A1 | 12/2012 | Abbott |
| 2013/0003106 A1 | 1/2013 | Lowery et al. |
| 2013/0029726 A1 | 1/2013 | Berionne et al. |

(56) References Cited

U.S. PATENT DOCUMENTS

| | | |
|---|---|---|
| 2013/0031060 A1 | 1/2013 | Lowery et al. |
| 2013/0058229 A1 | 3/2013 | Casado et al. |
| 2013/0073713 A1 | 3/2013 | Collin et al. |
| 2013/0091002 A1 | 4/2013 | Christie et al. |
| 2013/0114497 A1 | 5/2013 | Zhang et al. |
| 2013/0163758 A1 | 6/2013 | Swaminathan et al. |
| 2013/0182713 A1 | 7/2013 | Giacomoni et al. |
| 2013/0198322 A1 | 8/2013 | Oran et al. |
| 2013/0205361 A1 | 8/2013 | Narayanaswamy et al. |
| 2013/0238472 A1 | 9/2013 | Fan et al. |
| 2013/0290492 A1* | 10/2013 | ElArabawy ............. H04L 65/80 709/219 |
| 2013/0336122 A1 | 12/2013 | Baruah et al. |
| 2013/0339519 A1 | 12/2013 | Lientz |
| 2014/0025823 A1 | 1/2014 | Szabo et al. |
| 2014/0040478 A1 | 2/2014 | Hsu et al. |
| 2014/0059678 A1 | 2/2014 | Parker |
| 2014/0071895 A1 | 3/2014 | Bane et al. |
| 2014/0095661 A1 | 4/2014 | Knowles et al. |
| 2014/0099945 A1 | 4/2014 | Singh et al. |
| 2014/0105069 A1 | 4/2014 | Potnuru |
| 2014/0162705 A1 | 6/2014 | de Wit et al. |
| 2014/0171089 A1 | 6/2014 | Janakiraman et al. |
| 2014/0187199 A1 | 7/2014 | Yan et al. |
| 2014/0269484 A1 | 9/2014 | Dankberg et al. |
| 2014/0286316 A1 | 9/2014 | Park et al. |
| 2014/0317404 A1 | 10/2014 | Carlson et al. |
| 2014/0379910 A1* | 12/2014 | Saxena ................... H04L 47/70 709/225 |
| 2015/0058595 A1 | 2/2015 | Gura et al. |
| 2015/0189010 A1 | 6/2015 | van Bemmel |
| 2016/0006634 A1* | 1/2016 | Li ....................... H04L 43/0829 370/252 |
| 2016/0028855 A1 | 1/2016 | Goyal et al. |

FOREIGN PATENT DOCUMENTS

| | | |
|---|---|---|
| EP | 0744850 A2 | 11/1996 |
| EP | 1081918 A2 | 8/2000 |
| GB | 2489735 A | 10/2012 |
| JP | 6205006 A3 | 7/1994 |
| JP | 821924 B2 | 3/1996 |
| JP | 2000183935 A3 | 6/2000 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |
| WO | 0058870 | 3/2000 |
| WO | WO 00/58870 | 3/2000 |
| WO | 200239696 A2 | 5/2002 |
| WO | WO 2002/39696 A2 | 5/2002 |
| WO | 2006091040 A1 | 8/2006 |
| WO | WO 2006/091040 A1 | 8/2006 |
| WO | WO 2012/136828 A1 | 10/2012 |

OTHER PUBLICATIONS

F5 Networks Inc., "Case Information Log for 'Issues with BoNY upgrade to 4.31'", as early as Feb. 2008.

Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.

LaMonica M., "Infravio spills up Web services registry idea", CNET News.com, May 11, 2004, pp. 1-2, (http://www.news.com).

Macvittie, Lori, "Message-Based Load Balancing," Technical Brief, Jan. 2010, pp. 1-9, F5 Networks, Inc.

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

Sommers F., "Whats New in UDDI 3.0—Part 3", Web Services Papers, Sep. 2, 2003, pp. 1-4, (http://www.webservices.org/index.php/article/articleprint/894/-1/24/).

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

U.S. Appl. No. 13/307,923, filed Nov. 20, 2011, entitled "Methods for Content Inlining and Devices Thereof," Inventor, G. Lowell, Jr.

U.S. Appl. No. 13/473,589, filed May 16, 2012, entitled "Method for Load Balancing of Requests' Processing of Diameter Servers," Inventors, L. Ridel et al.

U.S. Appl. No. 13/771,538, filed Feb. 20, 2013, entitled "Methods for Improving Flow Cache Bandwidth Utilization and Devices Thereof," Inventors, T. Michaels et al.

U.S. Appl. No. 14/032,329, filed Sep. 20, 2013, entitled "System and Method for Smart Load Balancing," Inventors, R. Masters et al.

U.S. Appl. No. 14/038,433, filed Sep. 26, 2013, entitled "System and Method for Scaling a TCP Stack Across Multiple Cores Via Advertised Window Partitioning," Inventor, S. Amdahl.

U.S. Appl. No. 14/081,700, filed Nov. 15, 2013 entitled, "Methods to Ensure Load Balancing of NFS Requests to NAS Cluster and Devices Thereof," Inventor, B. McCann.

U.S. Appl. No. 14/194,268, filed Feb. 28, 2014, entitled "National Traffic Steering Device for a Better Control of a Specific Wireless/LTE Network," Inventors, L. Ridel et al.

U.S. Appl. No. 14/139,228, dated Dec. 23, 2013, entitled "Methods for Improving Network Traffic Management Device Performance and Devices Thereof," Inventors, S. Lewites et al.

U.S. Appl. No. 14/144,137, filed Dec. 30, 2013, entitled "System and Method for Utiliziing a Data Reducing Module for Dictionary Compression of Encoded Data," Inventor, S. Amdahl.

U.S. Appl. No. 14/042,237, filed Sep. 30, 2013, entitled "System and Method for Utilizing a Data Reducing Module for Dictionary Compression of Encoded Data," Inventor, S. Amdahl.

"A Process for Selective Routing of Servlet Content to Transcoding Modules," Research Disclosure 422124, Jun. 1999, pp. 889-890, IBM Corporation.

"Big-IP Controller with Exclusive OneConnect Content Switching Feature Provides a Breakthrough System for Maximizing Server and Network Performance," F5 Networks, Inc. Press Release, May 8, 2001, 2 pages, F5 Network, Las Vegas, Nevada.

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

"Respond to server depending on TCP::client_port", DevCentral Forums iRules, pp. 1-6, last accessed Mar. 26, 2010, (http://devcentral.f5.com/Default/aspx?tabid=53&forumid=5&tpage=l&v).

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"UDDI Overview", Sep. 6, 2000, pp. 1-21, uddi.org, (http://www.uddi.org/).

"UDDI Technical White Paper," Sep. 6, 2000, pp. 1-12, uddi-org, (http://www.uddi.org/).

"UDDI Version 3.0.1", UDDI Spec Technical Committee Specification, Oct. 14, 2003, pp. 1-383, uddi.org, (http://www.uddi.org/).

(56) References Cited

OTHER PUBLICATIONS

"Windows Server 2003 Kerberos Extensions," Microsoft TechNet, 2003 (Updated Jul. 31, 2004), http://technet.microsoft.com/en-us/library/cc738207, Microsoft Corporation.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.
Baer, T., et al., "The elements of Web services" ADTmag.com, Dec. 1, 2002, pp. 1-6, (http://www.adtmag.com).
Blue Coat, "Technology Primer: CIFS Protocol Optimization," Blue Coat Systems Inc., 2007, last accessed: Dec. 9, 2013, pp. 1-3, (http://www.bluecoat.com).
Borovick, Lucinda, "Addressing WAN Optimization in the Integrated Services Router", White Paper, Sponsored by: Cisco Systems, Oct. 2010, pgs. 1-11, IDC.
Cisco Systems, "Cisco Performance Routing (PfR)", PfR: Technology_Overview, 2010, pp. 1-23.
Cisco Systems, "Cisco Performance Routing", Data Sheet, 2010, pp. 1-10.
Cisco Systems, "Cisco Wide Area Application Services Software Version 4.4 Technical Overview", White Paper, 2011, pp. 1-24.
Crescendo Networks, "Application Layer Processing (ALP)," 2003-2009, pp. 168-186, Chapter 9, CN-5000E/5500E, Foxit Software Company.
F5 Networks Inc., "3-DNS® Reference Guide, version 4.5", F5 Networks Inc., Sep. 2002, pp. 2-1-2-28, 3-1-3-12, 5-1-5-24, Seattle, Washington.
F5 Networks Inc., "Big-IP® Reference Guide, version 4.5", F5 Networks Inc., Sep. 2002, pp. 11-1-11-32, Seattle, Washington.
F5 Networks Inc., "Case Information Log for 'Issues with BoNY upgrade to 4.3'", as early as Feb. 2008.
F5 Networks Inc., "Configuration Guide for Local Traffic Management," F5 Networks Inc., Jan. 2006, version 9.2.2, 406 pgs.
F5 Networks Inc., "Deploying the Big-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's 3-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
F5 Networks, Inc., "Big-IP® Local Traffic Manager™: Implementations", F5 Networks, Inc., Jul. 8, 2015, Version 11.6, pp. 1-340.
Fajardo V., "Open Diameter Software Architecture," Jun. 25, 2004, pp. 1-6, Version 1.0.7.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance,"Aug. 1993, pp. 1-22, IEEE/ACM Transactions on Networking, California..
Gupta et al., "Algorithms for Packet Classification", Computer Systems Laboratory, Stanford University, CA, Mar./Apr. 2001, pp. 1-29.
Heinz G., "Priorities in Stream Transmission Control Protocol (SCTP) Multistreaming", Thesis submitted to the Faculty of the University of Delaware, Spring 2003, pp. 1-35.
Hochmuth, Phil, "F5, CacheFlow pump up content-delivery lines," Network World Fusion, May 4, 2001, 1 page, Las Vegas, Nevada.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
International Search Report and The Written Opinion, for International Patent Application No. PCT/US2013/026615, dated Jul. 4, 2013.
International Search Report and The Written Opinion, for International Patent Application No. PCT/US2011/058469, dated May 30, 2012.
Internet Protocol,"DARPA Internet Program Protocol Specification", (RFC:791), Information Sciences Institute, University of Southern California, Sep. 1981, pp. 1-49.
Kawamoto, D., "Amazon files for Web services patent", CNET News.com, Jul. 28, 2005, pp. 1-2, (http://news.com).
LaMonica M., "Infravio spiffs up Web services registry idea", CNET News.com, May 11, 2004, pp. 1-2, (http://www.news.com).
MacVitte, Lori., "Message-Based Load Balancing" F5 Technical Brief, pp. 1-9, 2009.
MacVittie, L., "Why Not Network-Side Pre-Fetching?," 8 pp. (Apr. 14, 2009).
Modiano E., "Scheduling Algorithms for Message Transmission Over a Satellite Broadcast System," MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).
Ott D., et al., "A Mechanism for TCP-Friendly Transport-level Protocol Coordination", USENIX Annual Technical Conference, Jun. 10, 2002, University of North Carolina at Chapel Hill, pp. 1-12.
OWASP, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, Jul. 1, 1996, pp. 1-15.
Raghavan B., et al., "Cloud Control with Distributed Rate Limiting", SIGCOMM'07, Aug. 27-31, 2007, pp. 1-11, Department of Computer Science and Engineering, University of California, San Diego, CA.
Riverbed Technology, "Riverbed Certified Solutions Professional (RCSP) Study Guide, Exam 199-01 for RiOS v5.0", Aug. 2009, Version 2.0.2, see pp. 30-67.
Riverbed Technology, "Riverbed Optimization System (RiOS) 6.1, A Technical Overview", White Paper, 2009, pp. 1-27.
Rosen E., et al., "MPLS Label Stack Encoding", (RFC:3032) Network Working Group, Jan. 2001, pp. 1-22, (http://www.ietf.org/rfc/rfc3032.txt).
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Schilit B., "Bootstrapping Location—Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, (http://www.adtmag.com).
Shohoud, Y., "Building XML Web Services with VB .NET and VB 6", Addison Wesley, Sep. 2002, pp. 1-14.
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Snoeren A., et al., "Managing Cloud Resources:Distributed Rate Limited", Building and Programming the Cloud Workshop, Jan. 13, 2010, pp. 1-38, UCSDCSE Computer Science and Engineering.
Sommers F., "Whats New in Uddi 3.0—Part 1", Web Services Papers, Jan. 27, 2003, pp. 1-4, (http://www.webservices.org/index.php/article/articleprint/871/-1/24/).

(56) References Cited

OTHER PUBLICATIONS

Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/244.
Wang B., "Priority and realtime data transfer over the best-effort Internet", Dissertation Abstract,ScholarWorks@UMASS, Sep. 2005, pp. i-xiv and pp. 1-9.
Wikipedia, "Diameter (protocol)", pp. 1-11, last accessed Oct. 27, 2010, (http://en.wikipedia.org/wiki/Diameter_(protocol)).
Williams et al., "The Ultimate Windows Server 2003 System Administrator's Guide: Forwarding Authentication," 2003, 2 pages, Figure 10.7, Addison-Wesley Professional, Boston, Massachusetts.
Woo T.Y.C., "A Modular Approach to Packet Classification: Algorithms and Results", Nineteenth Animal Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

METHODS FOR TRAFFIC RATE CONTROL AND DEVICES THEREOF

This application claims the benefit of U.S. Provisional Patent Application No. 61/905,011, filed on Nov. 15, 2013, which is hereby incorporated by reference in its entirety.

FIELD

This technology generally relates to methods and devices for controlling the rate of network traffic and, more specifically, to controlling or shaping the rate of network traffic to reduce overhead and increase scalability.

BACKGROUND

Transmission Control Protocol (TCP) is used to facilitate communication between applications of a transmitting network device and a receiving network device using the Internet Protocol (IP). In particular, when a transmitting network device transmits data across a network (e.g., the Internet), application layer software on the transmitting network device issues a request using the TCP layer. The TCP layer handles routing and SEND/ACK details to ensure delivery of the data to the receiving network device.

Network congestion, traffic load balancing, or unpredictable network behavior can cause data packets to be lost, duplicated, or delivered out of order between transmitting and receiving network devices. The TCP layer detects these problems, requests retransmission of lost packets, rearranges out-of-order packets, and/or minimizes network congestion to mitigate anomalous activity. Once the receiving network device has reassembled data packets sent from the transmitting network device, it passes the data packets to the application running on the receiving network device.

When data packets are transmitted between transmitting and receiving network devices, rate or traffic shaping is used by a rate shaper of the transmitting network device to control the rate of flow at which data is transmitted. Typically, the receiving network device continually informs the transmitting network device as to how much data it can receive. When a buffer of the receiving network device fills with data, a subsequent acknowledgment sent to the transmitting network device includes a notification to suspend or stop sending data until the receiving network device is able to process the previously received data packets.

Network performance is generally maintained by using Quality of Service (QoS) functionality performed by the rate shaper, including as a QoS queue. Typically, a transmitting network device packetizes data in accordance with the TCP and sends the data packets to the QoS queue associated with a receiving network device (also referred to as a subscriber). The QoS queue stores the packetized packets and buffers them before transmitting them to control the traffic flow based on predetermined handling parameters. However, this process generally requires performing an enqueue and a dequeue of every packet, which can introduce significant overhead to the process. Additionally, QoS queues, as well as associated token buckets and timers, are not efficiently scalable, and therefore require significant resources to manage a large number of subscribers, which is undesirable.

SUMMARY

A method for traffic rate control, the method includes allocating, by a traffic management computing device, a proportional subset of an amount of tokens to each of one or more currently active subscribers of a plurality of subscribers. The proportional subset of the amount of tokens is allocated based on an estimated number of the plurality of subscribers that will be active in a next sampling period and is based on an established bandwidth profile and a token recharge rate. A request to transmit a first packet is received, by the traffic management computing device, from one of the currently active subscribers. A determination is made, by the traffic management computing device, when a current time is prior to an expiration of the proportional subset of the amount of tokens allocated to the one currently active subscriber. Next, a determination is made, by the traffic management computing device, when a length of the first packet is less than a size corresponding to an available portion of the proportional subset of the amount of tokens allocated to the one currently active subscriber, when the current time is determined to be prior to the expiration of the proportional subset of the amount of tokens allocated to the one currently active subscriber. The first packet is transmitted, by the traffic management computing device, when the length of the first packet is determined to be less than a size corresponding to an available portion of the proportional subset of the amount of tokens allocated to the one currently active subscriber.

A traffic management computing device includes configurable hardware logic configured to be capable of implementing, or a processor, and a memory coupled to the processor, which is configured to be capable of executing programmed instructions comprising and stored in the memory to allocate a proportional subset of an amount of tokens to each of one or more currently active subscribers of a plurality of subscribers. The proportional subset of the amount of tokens is allocated based on an estimated number of the plurality of subscribers that will be active in a next sampling period and is based on an established bandwidth profile and a token recharge rate. A request to transmit a first packet is received from one of the currently active subscribers. A determination is made when a current time is prior to an expiration of the proportional subset of the amount of tokens allocated to the one currently active subscriber. Next, a determination is made when a length of the first packet is less than a size corresponding to an available portion of the proportional subset of the amount of tokens allocated to the one currently active subscriber, when the current time is determined to be prior to the expiration of the proportional subset of the amount of tokens allocated to the one currently active subscriber. The first packet is transmitted when the length of the first packet is determined to be less than a size corresponding to an available portion of the proportional subset of the amount of tokens allocated to the one currently active subscriber.

A non-transitory computer readable medium having stored thereon instructions for traffic rate control comprising executable code which when executed by a processor, causes the processor to perform steps including allocating a proportional subset of an amount of tokens to each of one or more currently active subscribers of a plurality of subscribers. The proportional subset of the amount of tokens is allocated based on an estimated number of the plurality of subscribers that will be active in a next sampling period and is based on an established bandwidth profile and a token recharge rate. A request to transmit a first packet is received from one of the currently active subscribers. A determination is made when a current time is prior to an expiration of the proportional subset of the amount of tokens allocated to the one currently active subscriber. Next, a determination is made when a length of the first packet is less than a size corresponding to an available portion of the proportional subset of the amount of tokens allocated to the one currently active subscriber, when the current time is determined to be prior to the expiration of the proportional subset of the amount of tokens allocated to the one currently active subscriber. The first packet is transmitted when the length of the first packet is determined to be less than a size corresponding to an available portion of the proportional subset of the amount of tokens allocated to the one currently active subscriber.

This technology provides a number of advantages including more efficient and effective methods, non-transitory computer readable media, and devices for controlling the rate of network traffic. With this technology, all packets are not queued in order to manage the rate at which packets are transmitted. Accordingly, enqueue and dequeue methods are not performed for every packet, thereby reducing overhead. Additionally, reduced throughput due to trail dropping of packets associated with TCP connections is mitigated at least in part by implementing an early drop policy. Moreover, packets that are unable to be transmitted immediately are advantageously queued and resubmitted based on expiration of a flow timer, thereby reducing the amount of time required to transmit a packet that may have otherwise been dropped.

DETAILED DESCRIPTION

Figure 1:
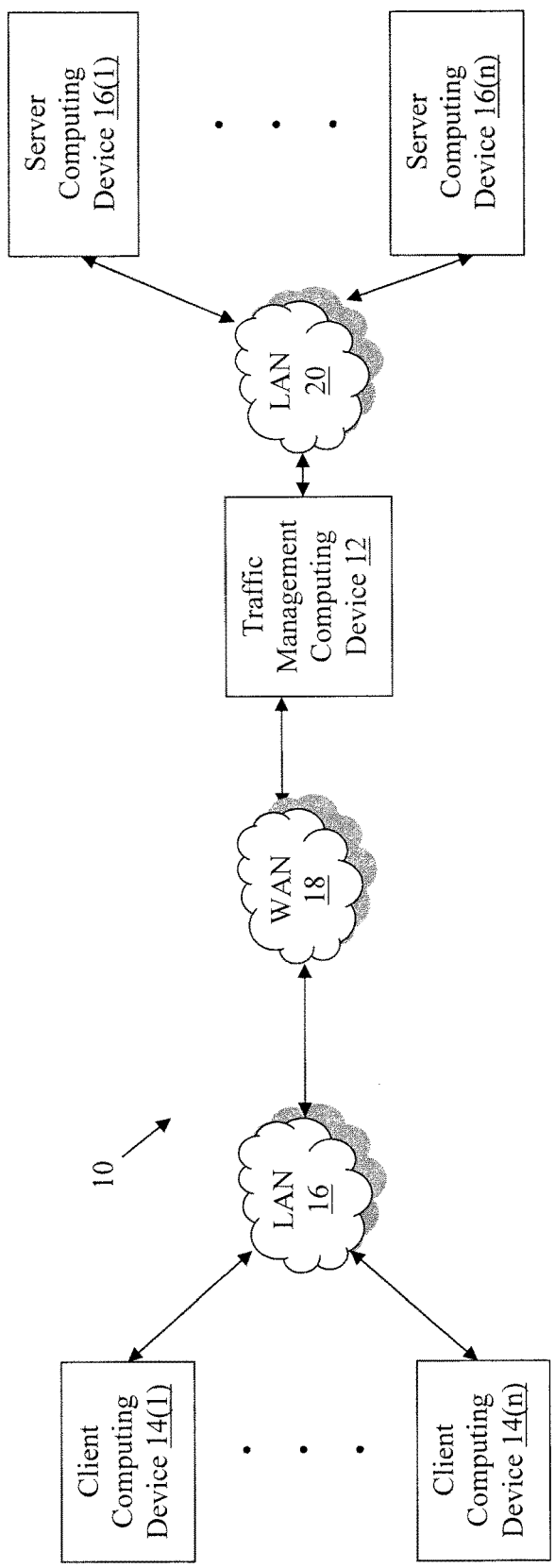
FIG. 1 is a block diagram of a network environment with an exemplary traffic management computing device.

Referring to FIG. 1, a block diagram of an exemplary network environment 10 including an exemplary traffic management computing device 12 is illustrated. In this example, the traffic management computing device 12 is coupled to a plurality of client computing devices 14(1)-14(n) through a local area network (LAN) 16 and a wide area network (WAN) 18 and a plurality of server computing devices 16(1)-16(n) through another LAN 20, although the traffic management computing device 12, client computing devices 14(1)-14(n), and server computing devices 16(1)-16(n) may be coupled together via other topologies. The network environment 10 may include other network devices such as one or more routers and/or switches, for example. Although, the traffic management computing device 12 implements the traffic rate control described and illustrated herein in this example, any other type of device running applications configured to handle HTTP communications by transmitting data using TCP connections, for example, can also be used. This technology provides a number of advantages including methods, non-transitory computer readable medium, and devices that facilitate relatively scalable bandwidth control for a large number of subscribers without using QoS queues and other resources dedicated to each subscriber.

Figure 2:
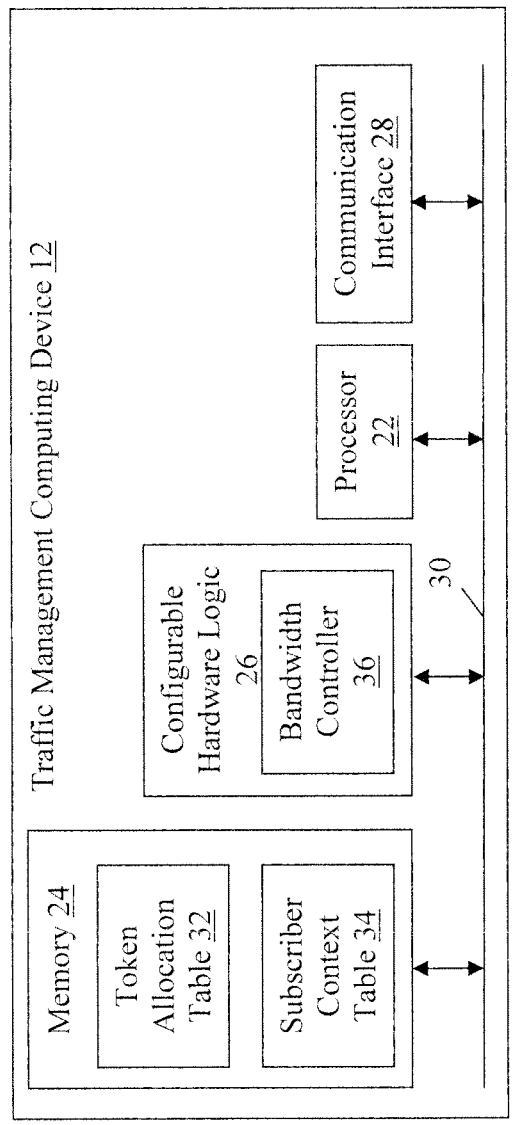
FIG. 2 is a block diagram of the exemplary traffic management computing device illustrated in FIG. 1.

Referring to FIGS. 1-2, the traffic management computing device 12 may perform any number of functions in addition to implementing traffic rate control, such as optionally optimizing, securing, and/or load balancing the network traffic exchanged between the client computing devices 14(1)-14(n) and the server computing devices 16(1)-16(n), for example. The traffic management computing device 12 includes a processor 22, a memory 24, optional configurable hardware logic 26, and a communication interface which are coupled together by a bus 32 or other communication link, although the traffic management computing device 12 may include other types and numbers of elements in other configurations.

The processor 22 of the traffic management computing device 12 may execute programmed instructions stored in the memory 24 of the traffic management computing device 12 for the any number of the functions identified above and/or described herein for controlling traffic rate and, optionally, managing network traffic and/or optimizing service of resource requests, for example. The processor 22 of the traffic management computing device 12 may comprise one or more central processing units and/or general purpose processors with one or more processing cores, for example.

The memory 24 of the traffic management computing device 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM), hard disk drives, solid state drives, or other computer readable medium which is read from and written to by a magnetic, optical, or other reading and writing system that is coupled to the processor, can be used for the memory 24.

In this example, the memory 24 further includes a token allocation table 32 and a subscriber context table 34. The token allocation table 32 includes information regarding allocation and available amount of tokens for each subscriber which corresponds to the allocated and available amount of bandwidth for the subscribers, as described and illustrated in more detail later. The subscriber context table 34 includes information regarding a state of each subscriber (e.g., active or inactive) and a transmission count for the current and/or any number of previous sampling periods, for example, as described and illustrated in more detail later.

The optional configurable hardware logic 26 of the traffic management computing device 12 may comprise specialized hardware configured to implement one or more steps of this technology as illustrated and described with reference to the examples herein. By way of example only, the configurable hardware logic 26 may comprise one or more of field programmable gate arrays (FPGAs), field programmable logic devices (FPLDs), application specific integrated circuits (ASICs) and/or programmable logic units (PLUs). In this example, the configurable hardware logic 26 includes a bandwidth controller 36 configured to implement one or more steps of this technology including processing packet transmission requests as described and illustrated in more detail later.

The communication interface 28 operatively couples and communicates between the traffic management computing device 12, the client computing devices 14(1)-14(n), and server computing devices 16(1)-16(n), which are all coupled together by the LANs 16 and 20 and WAN 18, although other types and numbers of communication networks or systems with other types and numbers of connections and configurations to other devices and elements. By way of example only, the LANs 16 and 20 and WAN 18 can use TCP/IP over Ethernet and industry-standard protocols, including NFS, CIFS, SOAP, XML, LDAP, and SNMP, although other types and numbers of communication networks, can be used.

The LANs 16 and 20 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 18 may comprise any wide area network (e.g., Internet), although any other type of traffic network topology may be used.

Each of the client computing devices 14(1)-14(n) and server computing devices 16(1)-16(n) includes a processor, a memory, and a communication interface, which are coupled together by a bus or other communication link, although other numbers and types of network devices could be used. The client computing devices may run interface applications, such as Web browsers, that may provide an interface to make requests for and receive content associated with applications hosted by the server computing devices 16(1)-16(n) via the LANs 16 and 20 and/or WAN 18.

The server computing devices 16(1)-16(n) may provide content or other network resources in response to requests directed toward the respective applications hosted by the server computing devices 16(1)-16(n) from the client computing devices 14(1)-14(n) via the LANs 16 and 20 and/or the WAN 18 according to the HTTP-based application RFC protocol or the CIFS or NFS protocol, for example. The server computing devices 16(1)-16(n) may be hardware or software or may represent a system with multiple server computing devices 16(1)-16(n) in a server computing device pool, which may include internal or external networks. Various network processing applications, such as CIFS applications, NFS applications, HTTP Web Server applications, and/or FTP applications, may be operating on the server computing devices 16(1)-16(n) and transmitting data (e.g., files or web pages) in response to requests from the client computing devices 14(1)-14(n).

Although the exemplary network environment 10 with the traffic management computing device 12, client computing devices 14(1)-14(n), server computing devices 16(1)-16(n), LANs 16 and 20, and WAN 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
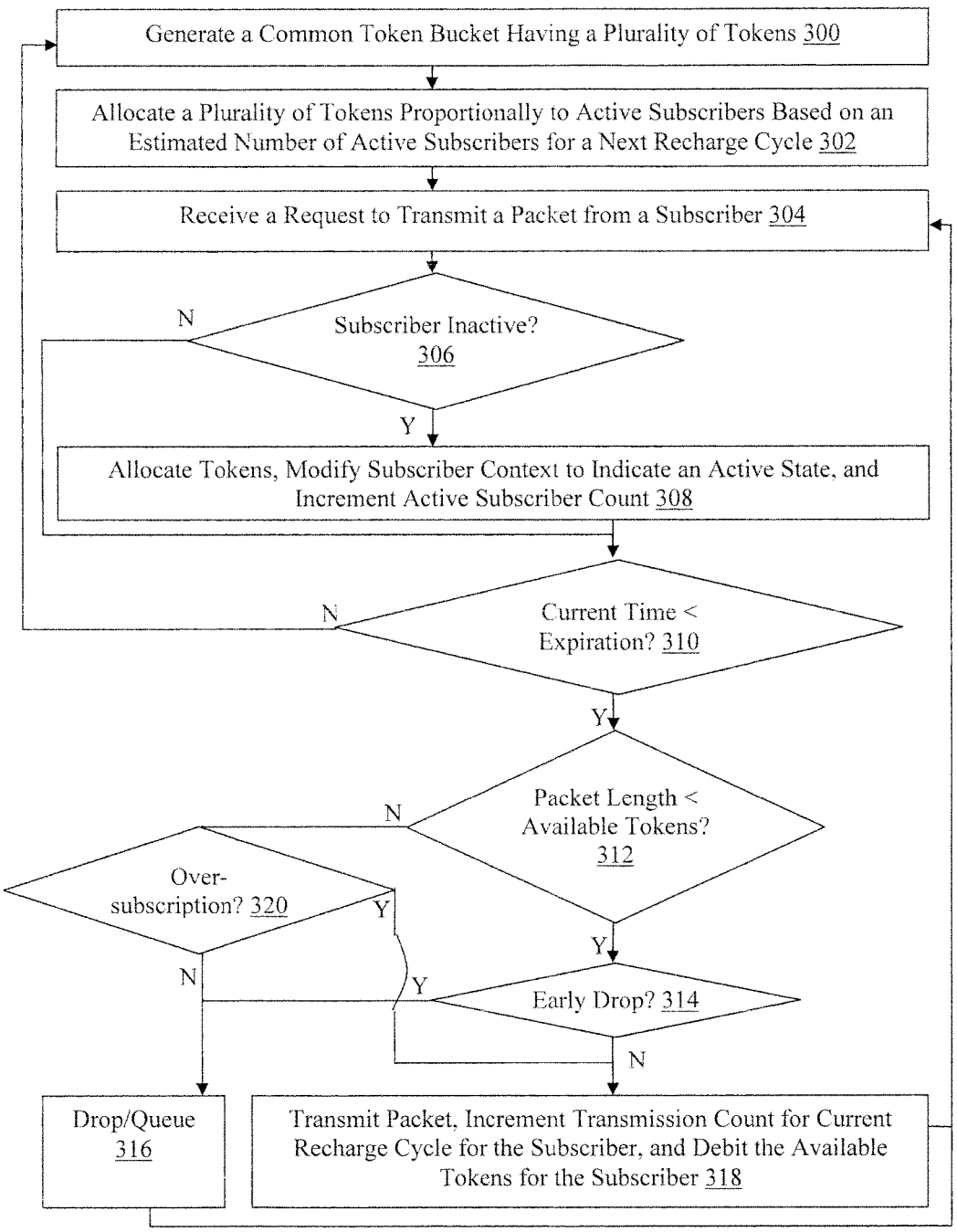
FIG. 3 is a flowchart of an exemplary method for allocating bandwidth and processing requests to transmit packets received from a subscriber.

An exemplary method for traffic rate control will now be described with reference to FIGS. 1-5. Referring more specifically to FIG. 3 a method for allocating bandwidth and processing requests to transmit packets received from a subscriber is illustrated. In step 300 in this example, the traffic management computing device 12 initializes the bandwidth controller by generating a common token bucket having a plurality of tokens. The number of tokens in, or the depth of, the common token bucket corresponds with an aggregate rate of all subscribers associated with a particular group or class and a token recharge rate.

The aggregate rate and token recharge rate can be established by a configuration provided by an administrator of the traffic management computing device 12, for example. The particular class of subscribers can be based on an association of the subscribers with a specific application or a specified network address or location, for example, although any other attributes can be used to identify a particular class of subscribers. Accordingly, in one example, the depth of the common token bucket corresponds with a network capacity for the class of subscribers.

In step 302, the traffic management computing device 12 allocates a plurality of tokens proportionally to active subscribers based on an estimated number of active subscribers for a next recharge cycle. The number of allocated tokens can be mapped to each active subscriber in the token allocation table 32. Each of the tokens corresponds with a size of network traffic (also referred to herein as packet length) that can be transmitted by an associated subscriber. Additionally, each token is valid for a specified duration and has an associated expiration.

The number of active subscribers can be estimated based on a moving average of active subscribers in a plurality of prior recharge cycles or based on a number of subscribers currently active at the time of the allocation, for example, although other methods of estimating the number of active subscribers for a next recharge cycle can also be used. A subscriber can be determined to be active based on a state value in an entry of the subscriber context table 34 corresponding to the subscriber and the number of active subscribers can be maintained in an active subscriber count stored in the memory, as described and illustrated in more detail later.

In step 304, the traffic management computing device 12 receives a request to transmit a packet from a subscriber. The request can be from a TCP stack associated with the subscriber and can be received by the bandwidth controller 36, for example. In this example, the subscriber can correspond to one of the client computing devices 14(1)-14(n), although the subscriber can be any other network device communicating with the traffic management computing device 12. Accordingly, the packet can be a portion of an application layer message, such as an HTTP request for content stored by one of the server computing devices 16(1)-16(n), for example, although any other type of packet with other content or information can also be used.

In step 306, the traffic management computing device 12 determines whether the subscriber that originated the request is inactive. Accordingly, the traffic management computing device 12 can query the subscriber context table 34 based on identifying information included in the packet, for example, to retrieve a state value. The state value can indicate an active or inactive state for a subscriber, as described and illustrated in more detail later with reference to FIG. 4. If the traffic management computing device 12 determines that the subscriber is inactive, then the Yes branch is taken to a step 308.

In step 308, the traffic management computing device 12 allocates tokens to the subscriber by inserting or modifying an entry of the token allocation table 32, modifies the context for the subscriber in the subscriber context table 34 to indicate an active state, and increments an active subscriber count stored in the memory 24. In this example, the number of tokens allocated to the subscriber is equivalent to the proportional number of tokens allocated to the active subscribers in step 302, although another amount or number of tokens can also be allocated to the subscriber.

Subsequent to allocating the tokens, modifying the corresponding entry of the subscriber context table 34, and incrementing the active subscriber count in step 308, or if the traffic management computing device 12 determines that the subscriber is not active and the No branch is taken from step 306, the traffic management computing device 12 proceeds to step 310. In step 310, the traffic management computing device 12 determines whether a current time is less than an expiration time for the tokens identified in the corresponding entry of the token allocation table 32 as available for use by the subscriber to transmit the packet. If the traffic management computing device 12 determines that the token duration or interval has been exceeded and the tokens are expired, then the No branch is taken back to step 300 and the traffic management computing device 12 again fills the common token bucket, as described and illustrated earlier. Optionally, the packet can be dropped or queued and resubmitted, such as described and illustrated in more detail later with reference to FIG. 5, for example, subsequent to the common token bucket being refilled.

Referring back to step 310, if the traffic management computing device 12 determines that the token duration or interval has not been exceeded, and that the tokens are not expired, then the Yes branch is taken to step 312. In step 312, the traffic management computing device 12 determines whether the length of the packet is less than a size corresponding to one or more available tokens allocated to the subscriber. The tokens available for the subscriber can be identified by querying the token allocation table 32, for example. Accordingly, if the traffic management computing device 12 determines that the subscriber does have sufficient tokens to transmit the packet in the current recharge cycle, then the Yes branch is taken to step 314.

In step 314, the traffic management computing device 12 implements an early drop policy to determine whether the packet should be dropped even though the subscriber has enough available tokens to transmit the packet. By implementing an early drop policy and dropping packets early in a recharge cycle, the traffic management computing device 12 can mitigate the undesirable effect on throughput introduced by tail dropping at the end of a recharge cycle. Pseudocode for one exemplary early drop policy is illustrated as follows:
1. If $(bi(t)<bi\_min\_th)$ ADMIT
2. Else {
3. p=rand( );
4. If $(p<(ri/fi))$ DROP;
5. }

In this example, ri is an input rate of packets received from the subscriber, fi is a fair rate for the subscriber, $bi(t)$ is the number of available tokens for the subscriber at time t, bi is the number of tokens allocated to the subscriber in the recharge cycle, and min_th is a minimum threshold number of the tokens allocated to the subscriber that must be used before any packets are dropped pursuant to this exemplary early drop policy. Accordingly, fi and min_th can be established by an administrator of the traffic management computing device 12, $bi(t)$ can be determined from the token allocation table 32, and bi can be the predetermined number of tokens allocated in steps 302 or 308, for example, although the parameters of the early drop policy can have other values and can be determined in other manners.

Pseudocode for another exemplary early drop policy is illustrated as follows:
1. Start: No early drop.
2. Count number of tail drop packets (X) out of N packets.
3. Set drop_window=N/X such that a packet is dropped once in every drop window.
4. If no tail drop then drop_window is increased by a fixed amount.
5. If packets are subsequently tail dropped, then recalculate drop_window.
6. Repeat the third through fifth steps.

Other early drop policies can also be implemented by the traffic management computing device 12 in step 314. If the traffic management computing device 12 determines that the packet should be dropped based on the implemented early drop policy, then the Yes branch is taken to step 316.

In step 316, the traffic management computing device 12 drops or queues the packet depending on a configuration provided by an administrator of the traffic management computing device 12. For example, if the traffic management computing device 12 is operating as a full proxy and terminating TCP connections from both the client computing devices 14(1)-14(n) and the server computing devices 16(1)-16(n), then the traffic management computing device 12 can be configured to queue the packet for later retransmission.

Conversely, if the traffic management computing device 12 is not operating as a full proxy, then the traffic management computing device 12 can be configured to drop the packet. In another example, the traffic management computing device 12 can be configured to drop all packets that the traffic management computing device 12 determines in step 314 should be dropped based on the implementation of the early drop policy. Other configurations establishing whether a packet should be dropped or queued, or another action should be taken, can also be used.

Referring back to step 314, if the traffic management computing device 12 determines that the packet should not be dropped based on the implemented early drop policy then the No branch is taken to step 318. In step 318, the traffic management computing device 12 transmits the packet using the communication interface 28. In step 318, the traffic management computing device 12 also increments a transmission count for the current recharge cycle for the subscriber. The transmission count can be stored in the subscriber context table 34 and can be used to determine whether the subscriber is currently in an active or inactive state, as described and illustrated in more detail later with reference to FIG. 4.

Additionally, the traffic management computing device 12 debits the available tokens for the subscriber in step 318. The amount of tokens allocated to the subscriber and currently available (not yet used) in the current recharge cycle can be maintained in, and debited from, the token allocation table 34, for example. Subsequent to transmitting the packet, incrementing the transmission count, and debiting the available tokens, or during any of steps 306-318, the traffic management computing device 12 receives another request to transmit a packet from the same or a different subscriber in the third step 304, as described and illustrated earlier.

Referring back to step 312, if the traffic management computing device 12 determines that the subscriber does not have sufficient tokens to transmit the packet in the current recharge cycle, then the No branch is taken to step 320. In step 320, the traffic management computing device 12 implements an oversubscription policy to determine whether the packet can be transmitted. Packets can be outstanding at the end of a recharge cycle when a subscriber runs out of tokens, the network is congested, and/or many subscribers became active and were allocated tokens in the recharge cycle, for example, although packets can be outstanding for other reasons.

Accordingly, an administrator of the traffic management computing device 12 can establish an oversubscription policy, the parameters of which can be stored in the memory 24 for example. The oversubscription policy generally provides for the borrowing of tokens in the next recharge cycle so that outstanding packets can be transmitted in the current recharge cycle. Outstanding packets can optionally be stored in a queue that is processed based on the oversubscription policy at the end of a recharge cycle, although the outstanding packets can also be stored elsewhere. Pseudocode for one exemplary oversubscription policy is illustrated as follows:

1. If ((Li=Len(packet(i)))<bi)
2. //Check if common token bucket (CTB) can transmit the packet at this instance,
3. If (Li > Ba(t))
4. DROP;
5. Else
6. //Borrow from EB if possible. Before borrowing can begin one packet must be sacrifices.
7. If (bi >=0 && Li<debt)
8. If (drop_before_excess_burst==FALSE) DROP
9. Else drop_before_excess_burst=TRUE:
10. Debt=(Li−bi)
11. bi=bi−Li;
12. ADMIT
13. Else
14. debt=0;
15. DROP In this example, bi is the aggregate maximum token depth of the common token bucket, Ba(t) is the available number of tokens at time t, and EB is an excessive burst size per subscriber that is predetermined by an administrator of the traffic management computing device 12. Other oversubscription policies can also be used.

Optionally, the oversubscription policy specifies a maximum number of tokens that can be borrowed from the next recharge cycle (e.g., an aggregate amount or an amount per subscriber) and the traffic management computing device 12 can maintain the number of tokens utilized to send at least a subset of the outstanding packets in the current recharge cycle. Accordingly, if the traffic management computing device 12 determines based on the implementation of the oversubscription policy that the packet cannot be transmitted, then the No branch is taken to step 316 and the packet is dropped or queued, as described and illustrated earlier. Alternatively, if the traffic management computing device 12 determines in step 320, based on the implementation of the oversubscription policy, that the packet can be transmitted, then the Yes branch is taken to step 318 and the packet is transmitted, as described and illustrated earlier.

Figure 4:
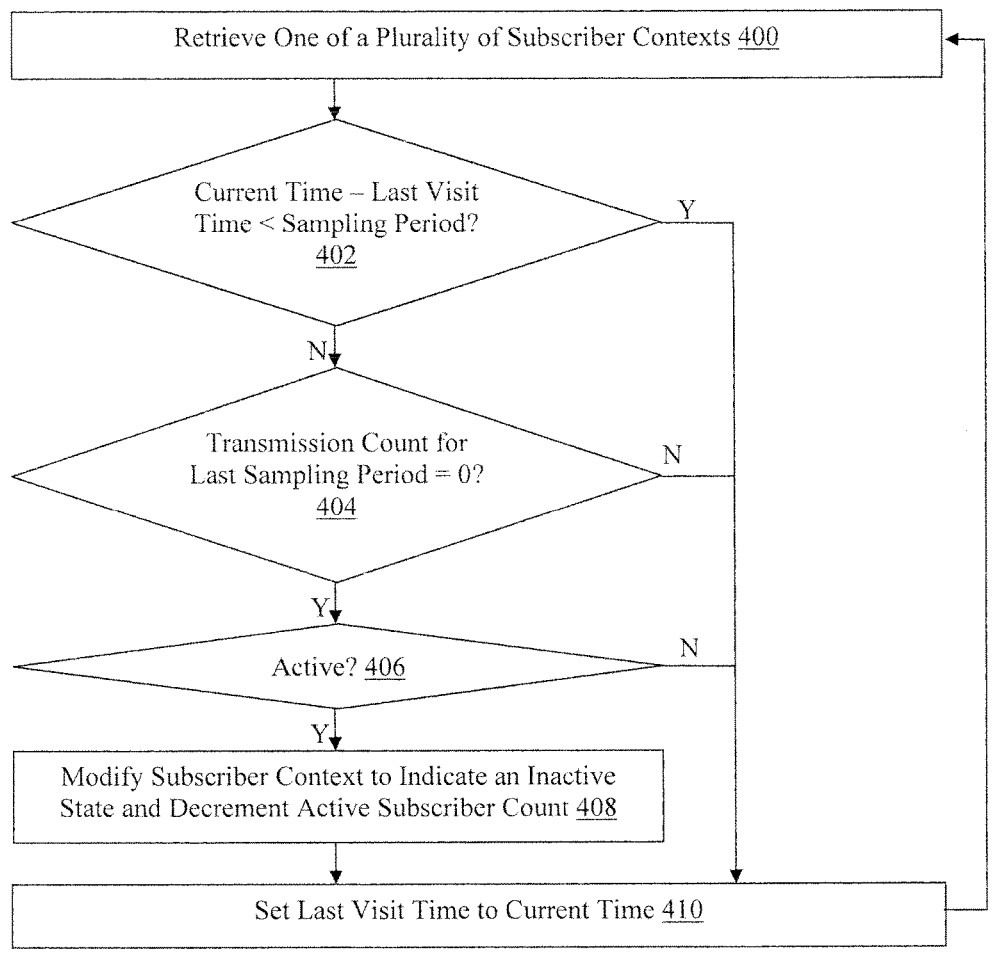
FIG. 4 is a flowchart of an exemplary method for sweeping subscriber contexts to maintain active and inactive states and an active subscriber count.

Referring more specifically to FIG. 4, an exemplary method for sweeping subscriber contexts in the subscriber context table 34 to maintain active and inactive states and an active subscriber count is illustrated. In this example, the sweeping of the subscriber contexts described and illustrated in FIG. 4 can be performed, such as by the bandwidth controller 36 for example, in parallel with the method of allocating bandwidth and processing requests to transmit packets described and illustrated earlier with reference to FIG. 3.

Accordingly, in step 400 in this example, the traffic management computing device 12 retrieves one of a plurality of subscriber contexts, which are stored in the subscriber context table 34 in this example. The subscriber contexts in this example include a unique indication of the subscriber, a transmission count for at least a current sampling period and a last sampling period, a state which can indicate an active or inactive state for the subscriber, and a last visit time. Other information can also be stored in the subscriber contexts.

In step 404, the traffic management computing device 12 determines whether the difference between a current time and the last visit time for the one subscriber context is less than the size of the sampling period. Accordingly, the traffic management computing device 12 essentially determines whether the subscriber context has already been visited/retrieved during the current sampling period. Optionally, the sampling period can correspond with the token recharge cycle configured by an administrator of the traffic management computing device 12, as described and illustrated earlier with reference to the step 300 of FIG. 3, although a different sampling period can also be used. Accordingly, if the traffic management computing device 12 determines that the difference between a current time and the last visit time for the one subscriber context is not less than the size of the sampling period, then the No branch is taken to step 404.

In step 404, the traffic management computing device 12 determines whether the transmission count for the last sampling period is equivalent to zero. If the transmission count for the last sampling period is equivalent to zero, then the subscriber associated with the one of the subscriber contexts was not active or did not transmit any packets during the last sampling period. If the subscriber associated with the one of the subscriber contexts did transmit one or more packets in the last sampling period, then the transmission count would have been incremented as described and illustrated earlier with reference to step 318 of FIG. 3 and would not be equivalent to zero.

Optionally, in other examples, the traffic management computing device 12 can determine whether the transmission count for a specified number of prior sampling periods, and/or the current sampling period, is also equivalent to zero depending on how many sampling periods of inactivity an administrator of the traffic management computing device 12 would like to require prior to changing the state of the subscriber context to indicate an inactive state. Accordingly, if the traffic management computing device 12 determines that the transmission count for the last sampling period is equivalent to zero, then the Yes branch is taken to step 406.

In step 406, the traffic management computing device 12 determines whether the state in the one subscriber context indicates an active state. If the traffic management computing device 12 determines that the state in the one subscriber context indicates an active state, then the Yes branch is taken to step 408. In step 408, the traffic management computing device 12 modifies the one subscriber context to indicate an inactive state and decrements an active subscriber count. The active subscriber count can be maintained in the memory 24, as described and illustrated earlier with reference to step 308 of FIG. 3, and can be used to generated the common token bucket and/or to allocate the plurality of tokens, as described and illustrated earlier with reference to the steps 300-302 of FIG. 3.

Subsequent to modifying the subscriber context, or if the traffic management computing device 12 determines that the difference between the current time and the last visit time is less than the size of the sampling period in step 402 and the Yes branch is taken, the transmission count for the last sampling period is not equivalent to zero in step 404 and the No branch is taken, or the state in the one subscriber context does not indicate an active state in step 406 and the No branch is taken, the traffic management computing device 12 proceeds to step 410. In step 410, the traffic management computing device 12 sets the last visit time of the one subscriber context to the current time. Subsequent to setting the last visit time to the current time, the traffic management computing device 12 proceeds back to step 400 and retrieves another one of the subscriber contexts from the subscriber context table 34, as described and illustrated earlier.

Figure 5:
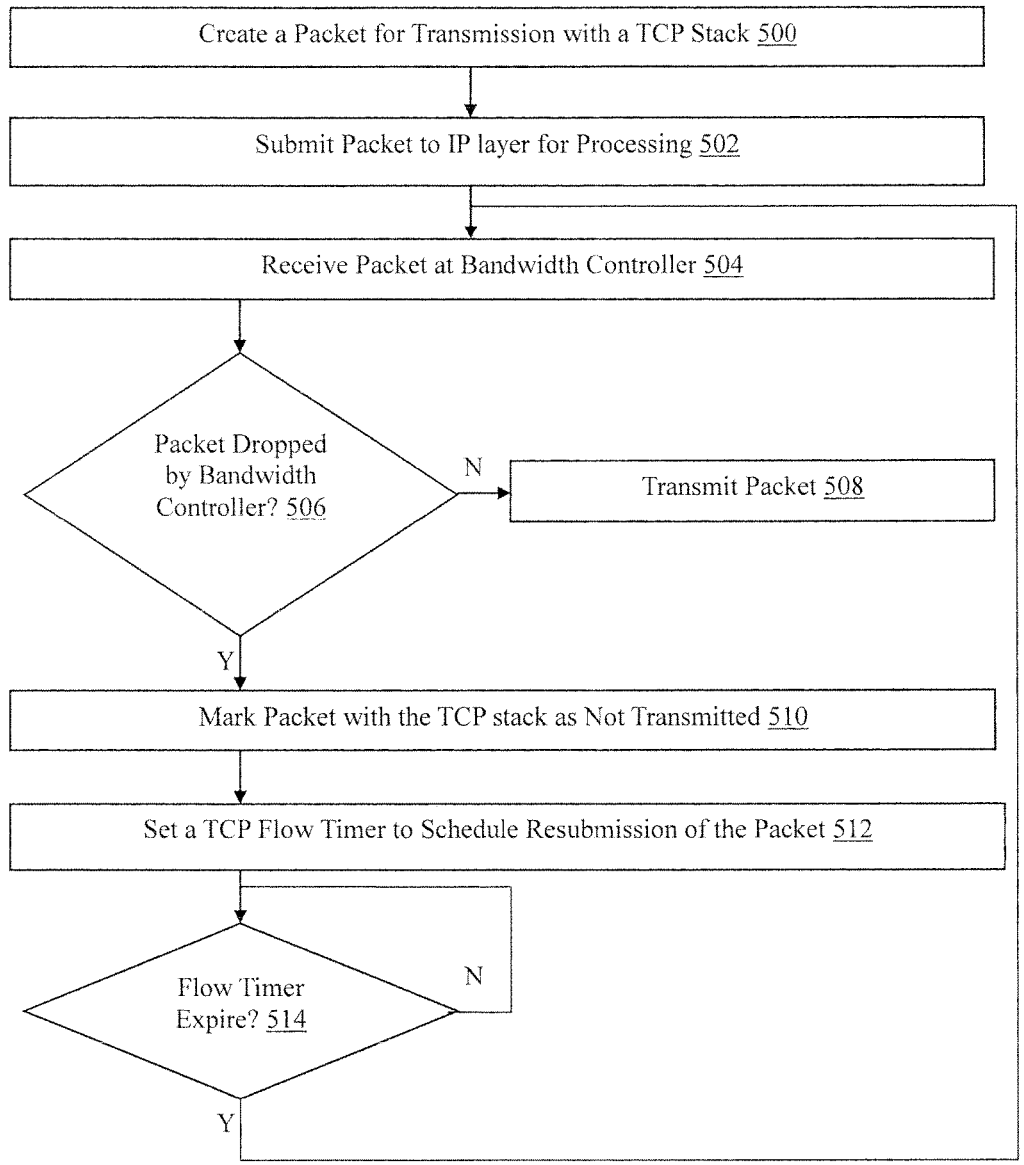
FIG. 5 is a flowchart of an exemplary method for processing dropped packets.

Referring more specifically to FIG. 5, an exemplary method for processing dropped packets, such as those packets determined to be dropped or queued in step 316 for example, is illustrated. In this example, the traffic management computing device 12 is configured to operate as a full proxy terminating TCP connections between the client computing devices 14(1)-14(n) and server computing devices 16(1)-16(n), although other operational configurations for the traffic management computing device 12 can also be used. In step 500 in this example, the traffic management computing device 12 creates a data packet for transmission. The packet can be created by a TCP stack associated with a subscriber, for example.

In step 502, the traffic management computing device 12(1)-12(n) submits the packet to the IP layer for processing. The packet can be submitted to the IP layer by the TCP stack, for example. In step 504, the traffic management computing device 12 receives the packet, such as at the bandwidth controller 36 and from the TCP stack, for example. Accordingly, step 504 in FIG. 5 corresponds with step 304 in FIG. 3 in this example.

In step 506, the traffic management computing device 12 determines whether the bandwidth controller 36 decided to drop the packet. The packet can be dropped as described and illustrated earlier with reference to step 316 of FIG. 3, such as when a length of the packet is less than a size corresponding to an available amount of tokens allocated to the subscriber, or based on a result of an implemented early drop policy, for example, although the packet can also be dropped for other reasons. If the traffic management computing device 12 determines that the packet was not determined to be dropped by the bandwidth controller 36, then the No branch is taken to step 508. In step 508, the packet is transmitted as described and illustrated earlier with reference to step 318 of FIG. 3.

Referring back to step 506, if the traffic management computing device 12 determines that the packet was determined to be dropped by the bandwidth controller 36, then the Yes branch is taken to step 510. In step 510, the traffic management computing device 12 marks the packet as not transmitted and, optionally, sends the packet back to the TCP stack or places the packet in a queue associated with the TCP stack, for example. In one example, the packet can be marked based on an indication associated with the packet stored in a portion of the memory 24 utilized by the TCP stack to store and retrieve packets, for example. In another example, the bandwidth controller 36 sends a return code to the TCP stack from which the packet was received to indicate that the packet has been marked. Other manners of marking the packet can also be used.

In step 512, the traffic management computing device 12 sets a TCP flow timer in the memory 24 to schedule resubmission of the packet by the TCP stack to the bandwidth controller 36. Optionally, the TCP flow timer can be set by the bandwidth controller 36 based on the token recharge rate of the bandwidth controller 36 so that resubmission of the packet occurs in a next recharge cycle during which the subscriber associated with the TCP stack may have available tokens that can be used to transmit the packet.

Accordingly, in step 514, the traffic management computing device 12 determines whether the flow time has expired. If the traffic management computing device 12 determines that the flow timer has not expired, then the No branch is taken back to step 514, and the traffic management computing device 12 effectively waits for the flow timer to expire. However, if the traffic management computing device 12 determines in step 514 that the flow timer has expired, then the Yes branch is taken back to step 504.

Accordingly, when the flow timer has expired, the traffic management computing device 12 notifies the TCP stack and the bandwidth controller 36 receives a second request to transmit the packet. In this example, the packet can then be processed as described and illustrated earlier with reference to the steps 304-320 of FIG. 3 and the traffic management computing device can again determine whether the packet was determined to be dropped by the bandwidth controller 36 in step 506 of FIG. 5

By this technology, bandwidth control, traffic rate control, and/or traffic rate shaping policies can be implemented with reduced overhead and increased scalability since each packet does not have to be enqueued and dequeued, and a queue does not have to be maintained for each subscriber. Instead, requests to transmit packets of a specified size can be serviced with tokens and an allocated quota per subscriber per recharge cycle can be used to limit the bandwidth utilized in a time period. Advantageously, an early drop policy can be implemented to mitigate the reduced throughput resulting from tail dropping packets for TCP connections. Additionally, packets determined to be dropped can be more effectively processed and resubmitted based on expiration of a flow timer, thereby reducing the time required to transmit a packet that would otherwise have been dropped to a destination.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for traffic rate control implemented by a network traffic management system comprising one or more network traffic management devices, server devices, or client devices, the method comprising:
allocating a proportional subset of an amount of tokens to a plurality of subscribers based on an estimated number of the plurality of subscribers that will be active in a next sampling period;
receiving a request to transmit a first packet from a subscriber of the plurality of subscribers;
querying a database to retrieve a state value associated with the subscriber;
determining when the subscriber is in an active state based on analyzing the retrieved state value;
determining an expiration time associated with each of the tokens in the allocated proportional subset of the amount of tokens, when the determination indicates that the subscriber is in the active state;
comparing the determined expiration time associated with each of the tokens in the allocated proportional subset of the amount of tokens with a current time;
determining the expiration time associated with each of the tokens in the allocated proportional subset of the amount of tokens has not expired when the comparison indicates that the current time is less than an expiration time;
determining when the first packet is to be transmitted based on one or more token policies upon determining that the expiration time associated with each of the tokens in the allocated proportional subset of the amount of tokens has not expired;
queuing the first packet in a first queue when the determining indicates that the first packet cannot transmitted based on the one or more token policies;
retrieving one of a plurality of subscriber contexts associated with the subscriber of the plurality of subscribers;
determining when a difference between a current time and a last visit time of the one subscriber context is less than a size of a sampling period, a transmission count of the one subscriber context is equal to zero for a last sampling period, and a state of the one subscriber context indicates an active state;
setting a last visit time of the one subscriber context to the current time; and
repeating the retrieving, determining, and setting for each other of the plurality of subscriber contexts.

2. The method of claim 1, further comprising:
transmitting the first packet, without queueing the first packet, when the determining indicates that the first packet is to be transmitted based on the one or more token policies, wherein the one or more token policies comprises borrowing tokens from the next sampling period.

3. The method of claim 1, further comprising:
determining when a flow time associated with the first packet has expired;
scheduling a resubmission of the queued first packet when the determination indicates that the flow time has expired;
receiving a request to transmit a second packet from one currently inactive subscriber of the plurality of subscribers;
allocating a plurality of tokens equivalent to the proportional subset of the amount of tokens to the one currently inactive subscriber;
transmitting the second packet;
incrementing a transmission count for a current sampling period for the one currently inactive subscriber;
debiting the proportional subset of tokens allocated to the one currently inactive subscriber based on a length of the second packet; and
modifying a subscriber context corresponding to the one currently inactive subscriber to indicate an active state.

4. The method of claim 1, further comprising:
determining when there are one or more outstanding packets;
implementing the one or more token policies to determine when one or more of the outstanding packets are able to be transmitted when the determining indicates that there are the one or more outstanding packets; and
transmitting the one or more of the outstanding packets and repeating the allocating, wherein the amount of tokens is reduced based on a size of the one or more of the outstanding packets, when the determining indicates that the one or more of the outstanding packets are able to be transmitted.

5. The method of claim 1, further comprising:
implementing an early drop policy to determine when the first packet is able to be transmitted when a length of the first packet is determined to be less than a size corresponding to the allocated proportional subset of the amount of tokens allocated to the one of the subscriber in the active state;
only transmitting the first packet when the determining indicates that the first packet is able to be transmitted; and
marking the first packet as not transmitted, setting a TCP flow timer, determining when the TCP flow timer has expired, and receiving another request to transmit the first packet when the determining indicates that the TCP flow timer has expired, when the determining indicates that the first packet is able to be transmitted based on the implemented early drop policy or when the determining indicates that the length of the first packet is not less than a size corresponding to the allocated proportional subset of the amount of tokens allocated to the one of the subscriber in the active state.

6. A traffic management computing device, comprising memory comprising programmed instructions stored thereon and one or more processors configured to be capable of executing the stored programmed instructions to:
allocate a proportional subset of an amount of tokens to a plurality of subscribers based on an estimated number of the plurality of subscribers that will be active in a next sampling period;
receive a request to transmit a first packet from a subscriber of the plurality of subscribers;
query a database to retrieve a state value associated with the subscriber;
determine when the subscriber is in an active state based on analyzing the retrieved state value;
determine an expiration time associated with each of the tokens in the allocated proportional subset of the amount of tokens, when the determination indicates that the subscriber is in the active state;
compare the determined expiration time associated with each of the tokens in the allocated proportional subset of the amount of tokens with a current time;
determine the expiration time associated with each of the tokens in the allocated proportional subset of the amount of tokens has not expired, when the comparison indicates that the current time is less than an expiration time;

determine when the first packet is to be transmitted based on one or more token policies upon determining that the expiration time associated with each of the tokens in the allocated proportional subset of the amount of tokens has not expired;

queue the first packet in a first queue when the determining indicates that the first packet cannot be transmitted based on the one or more token policies;

retrieve one of a plurality of subscriber contexts associated with the subscriber of the plurality of subscribers;

determine when a difference between a current time and a last visit time of the one subscriber context is less than a size of a sampling period, a transmission count of the one subscriber context is equal to zero for a last sampling period, and a state of the one subscriber context indicates an active state;

set a last visit time of the one subscriber context to the current time; and repeat the retrieving, determining, and setting for each other of the plurality of subscriber contexts.

7. The traffic management computing device of claim 6, wherein the one or more processors are further configured to be capable of executing the stored programmed instructions to:

transmit the first packet, without queueing the first packet, when the determining indicates that the first packet is to be transmitted based on the one or more token policies, wherein the one or more token policies comprises borrowing tokens from the next sampling period.

8. The traffic management computing device of claim 6, wherein the one or more processors are further configured to be capable of executing the stored programmed instructions to:

determine when a flow time associated with the first packet has expired;

schedule a resubmission of the queued first packet when the determination indicates that the flow time has expired;

receive a request to transmit a second packet from one currently inactive subscriber of the plurality of subscribers;

allocate a plurality of tokens equivalent to the proportional subset of the amount of tokens to the one currently active subscriber;

transmit the second packet;

increment a transmission count for a current sampling period for the one currently inactive subscriber;

debit the proportional subset of tokens allocated to the one currently inactive subscriber based on a length of the second packet; and modify a subscriber context corresponding to the one currently inactive subscriber to indicate an active state.

9. The traffic management computing device of claim 6, wherein the one or more processors are further configured to be capable of executing the stored programmed instructions to:

determine when there are one or more outstanding packets;

implement the one or more token policies to determine when one or more of the outstanding packets are able to be transmitted when the determining indicates that there are the one or more outstanding packets; and transmit the one or more of the outstanding packets and repeat the allocating, wherein the amount of tokens is reduced based on a size of the one or more of the outstanding packets, when the determining indicates that the one or more of the outstanding packets are able to be transmitted.

10. The traffic management computing device of claim 6, wherein the one or more processors are further configured to be capable of executing the stored programmed instructions to:

implement an early drop policy to determine when the first packet is able to be transmitted when a length of the first packet is determined to be less than a size corresponding to the allocated proportional subset of the amount of tokens allocated to the one of the subscriber in the active state;

only transmit the first packet when the determining indicates that the first packet is able to be transmitted; and mark the first packet as not transmitted, setting a TCP flow timer, determining when the TCP flow timer has expired, and receiving another request to transmit the first packet when the determining indicates that the TCP flow timer has expired, when the determining indicates that the first packet is able to be transmitted based on the implemented early drop policy or when the determining indicates that the length of the first packet is not less than a size corresponding to the allocated proportional subset of the amount of tokens allocated to the one of the subscriber in the active state.

11. A non-transitory computer readable medium having stored thereon instructions for traffic rate control comprising machine executable code which when executed by one or more processors, causes the one or more processors to:

allocate a proportional subset of an amount of tokens to a plurality of subscribers based on an estimated number of the plurality of subscribers that will be active in a next sampling period;

receive a request to transmit a first packet from a subscriber of the plurality of subscribers;

query a database to retrieve a state value associated with the subscriber;

determine when subscriber is in an active state based on analyzing the retrieved state value;

determine an expiration time associated with each of the tokens in the allocated proportional subset of the amount of tokens, when the determination indicates that the subscriber is in the active state;

compare the determined expiration time associated with each of the tokens in the allocated proportional subset of the amount of tokens with a current time;

determine the expiration time associated with each of the tokens in the allocated proportional subset of the amount of tokens has not expired when the comparison indicates that the current time is less than an expiration time;

determine when the first packet is to be transmitted based on one or more token policies upon determining that the expiration time associated with each of the tokens in the allocated proportional subset of the amount of tokens has not expired;

queue the first packet in a first queue when the determining indicates that the first packet cannot-be transmitted based on the one or more token policies;

retrieve one of a plurality of subscriber contexts associated with the subscriber of the plurality of subscribers;

determine when a difference between a current time and a last visit time of the one subscriber context is less than a size of a sampling period, a transmission count of the one subscriber context is equal to zero for a last sampling period, and a state of the one subscriber context indicates an active state;

set a last visit time of the one subscriber context to the current time; and repeat the retrieving, determining, and setting for each other of the plurality of subscriber contexts.

12. The non-transitory computer readable medium of claim 11, wherein the machine executable code when executed by the one or more processors further causes the one or more processors to:

transmit the first packet, without queueing the first packet, when the determining indicates that the first packet is to be transmitted based on the one or more token policies, wherein the one or more token policies comprises borrowing tokens from the next sampling period.

13. The non-transitory computer readable medium of claim 11, wherein the machine executable code when executed by the one or more processors further causes the one or more processors to:

determine when a flow time associated with the first packet has expired;

schedule a resubmission of the queued first packet when the determination indicates that the flow time has expired;

receive a request to transmit a second packet from one currently inactive subscriber of the plurality of subscribers;

allocate a plurality of tokens equivalent to the proportional subset of the amount of tokens to the one currently active subscriber;

transmit the second packet;

increment a transmission count for a current sampling period for the one currently inactive subscriber;

debit the proportional subset of tokens allocated to the one currently inactive subscriber based on a length of the second packet; and modify a subscriber context corresponding to the one currently inactive subscriber to indicate an active state.

14. The non-transitory computer readable medium of claim 11, wherein the machine executable code when executed by the one or more processors further causes the one or more processors to:

determine when there are one or more outstanding packets;

implement the one or more token policies to determine when one or more of the outstanding packets are able to be transmitted when the determining indicates that there are the one or more outstanding packets; and transmit the one or more of the outstanding packets and repeat the allocating, wherein the amount of tokens is reduced based on a size of the one or more of the outstanding packets, when the determining indicates that the one or more of the outstanding packets are able to be transmitted.

15. The non-transitory computer readable medium of claim 11, wherein the machine executable code when executed by the one or more processors further causes the one or more processors to:

implement an early drop policy to determine when the first packet is able to be transmitted when a length of the first packet is determined to be less than a size corresponding to the allocated proportional subset of the amount of tokens allocated to the one of the subscriber in the active state;

only transmit the first packet when the determining indicates that the first packet is able to be transmitted; and mark the first packet as not transmitted, setting a TCP flow timer, determining when the TCP flow timer has expired, and receiving another request to transmit the first packet when the determining indicates that the TCP flow timer has expired, when the determining indicates that the first packet is able to be transmitted based on the implemented early drop policy or when the determining indicates that the length of the first packet is not less than a size corresponding to the allocated proportional subset of the amount of tokens allocated to the one of the subscriber in the active state.

16. A network traffic management system, comprising one or more network traffic management devices, server devices, or client devices, the network traffic management system comprising memory comprising programmed instructions stored thereon and one or more processors configured to be capable of executing the stored programmed instructions to:

allocate a proportional subset of an amount of tokens to a plurality of subscribers based on an estimated number of the plurality of subscribers that will be active in a next sampling period;

receive a request to transmit a first packet from a subscriber of the plurality of subscribers;

query a database to retrieve a state value associated with the subscriber;

determine when the subscriber is in an active state based on analyzing the retrieved state value;

determine an expiration time associated with each of the tokens in the allocated proportional subset of the amount of tokens, when the determination indicates that the subscriber is in the active state;

compare the determined expiration time associated with each of the tokens in the allocated proportional subset of the amount of tokens with a current time;

determine the expiration time associated with each of the tokens in the allocated proportional subset of the amount of tokens has not expired when the comparison indicates that the current time is less than an expiration time;

determine when the first packet is to be transmitted based on one or more token policies upon determining that the expiration time associated with each of the tokens in the allocated proportional subset of the amount of tokens has not expired;

queue the first packet in a first queue when the determining indicates that the first packet cannot be transmitted based on the one or more token policies;

retrieve one of a plurality of subscriber contexts associated with the subscriber of the plurality of subscribers;

determine when a difference between a current time and a last visit time of the one subscriber context is less than a size of a sampling period, a transmission count of the one subscriber context is equal to zero for a last sampling period, and a state of the one subscriber context indicates an active state;

set a last visit time of the one subscriber context to the current time; and repeat the retrieving, determining, and setting for each other of the plurality of subscriber contexts.

17. The network traffic management system of claim 16, wherein the one or more processors are further configured to be capable of executing the stored programmed instructions to:

transmit the first packet, without queueing the first packet, when the determining indicates that the first packet is to be transmitted based on the one or more token policies, wherein the one or more token policies comprises borrowing tokens from the next sampling period.

18. The network traffic management system of claim 16, wherein the one or more processors are further configured to be capable of executing the stored programmed instructions to:

determine when a flow time associated with the first packet has expired; and schedule a resubmission of the queued first packet when the determination indicates that the flow time has expired;

receive a request to transmit a second packet from one currently inactive subscriber of the plurality of subscribers;

allocate a plurality of tokens equivalent to the proportional subset of the amount of tokens to the one currently active subscriber;

transmit the second packet;

increment a transmission count for a current sampling period for the one currently inactive subscriber;

debit the proportional subset of tokens allocated to the one currently inactive subscriber based on a length of the second packet; and modify a subscriber context corresponding to the one currently inactive subscriber to indicate an active state.

19. The network traffic management system of claim 16, wherein the one or more processors are further configured to be capable of executing the stored programmed instructions to:

determine when there are one or more outstanding packets;

implement the one or more token policies to determine when one or more of the outstanding packets are able to be transmitted when the determining indicates that there are the one or more outstanding packets; and transmit the one or more of the outstanding packets and repeat the allocating, wherein the amount of tokens is reduced based on a size of the one or more of the outstanding packets, when the determining indicates that the one or more of the outstanding packets are able to be transmitted.

20. The network traffic management system of claim 16, wherein the one or more processors are further configured to be capable of executing the stored programmed instructions to:

implement an early drop policy to determine when the first packet is able to be transmitted when a length of the first packet is determined to be less than a size corresponding to the allocated proportional subset of the amount of tokens allocated to the one of the subscriber in the active state;

only transmit the first packet when the determining indicates that the first packet is able to be transmitted; and mark the first packet as not transmitted, setting a TCP flow timer, determining when the TCP flow timer has expired, and receiving another request to transmit the first packet when the determining indicates that the TCP flow timer has expired, when the determining indicates that the first packet is able to be transmitted based on the implemented early drop policy or when the determining indicates that the length of the first packet is not less than a size corresponding to the allocated proportional subset of the amount of tokens allocated to the one of the subscriber in the active state.

* * * * *